United States Patent
Zhang et al.

(10) Patent No.: US 11,745,944 B2
(45) Date of Patent: Sep. 5, 2023

(54) THREE-DIMENSIONAL WAREHOUSE SYSTEM

(71) Applicant: SHENZHEN WHALEHOUSE TECHNOLOGY COMPANY LIMITED, Shenzhen (CN)

(72) Inventors: Jun Zhang, Guangdong (CN); Linzi Li, Guangdong (CN); Mengwen Zhang, Guangdong (CN); Qingshi Gao, Guangdong (CN); Yuqi Ren, Guangdong (CN)

(73) Assignee: SHENZHEN WHALEHOUSE TECHNOLOGY COMPANY LIMITED, Shenzhen (CN)

( * ) Notice: Subject to any disclaimer, the term of this patent is extended or adjusted under 35 U.S.C. 154(b) by 227 days.

(21) Appl. No.: 17/148,498

(22) Filed: Jan. 13, 2021

(65) Prior Publication Data

US 2021/0237971 A1    Aug. 5, 2021

Related U.S. Application Data

(63) Continuation of application No. PCT/CN2019/097339, filed on Jul. 23, 2019.

(30) Foreign Application Priority Data

Jul. 24, 2018 (CN) .......................... 201810822376.9

(51) Int. Cl.
 *B65G 1/04* (2006.01)
 *B65G 1/137* (2006.01)

(52) U.S. Cl.
 CPC ......... *B65G 1/0414* (2013.01); *B65G 1/0428* (2013.01); *B65G 1/0464* (2013.01);
 (Continued)

(58) Field of Classification Search
 CPC .............................. B65G 1/0414; B65G 1/0464
 See application file for complete search history.

(56) References Cited

U.S. PATENT DOCUMENTS 3,863,777 A    2/1975 Murata
6,149,366 A *  11/2000 Deandrea ............. B65G 1/0414
                                                414/279
(Continued)

FOREIGN PATENT DOCUMENTS

CN    101259918 A    9/2008
CN    102085957 A    6/2011
(Continued)

OTHER PUBLICATIONS

Search report of CN application No. 2019800481638 dated Dec. 22, 2021.

(Continued)

*Primary Examiner* — Jonathan Snelting
(74) *Attorney, Agent, or Firm* — Andrew C. Cheng

(57) ABSTRACT

The present invention is to provide a solution of high density storage and goods-to-man picking by proposing a three dimensional warehouse system for accurate inbound and outbound operation and management and improved space utilization rate of the warehouse. The technical solution includes a rack, containers, carrier vehicles, and track-switching devices. The rack includes a track structure and defines at least one load-bearing platform. The track structure includes running tracks, and the at least one load-bearing platform located below the running track. Each container stores goods, and part of the containers are stacked and placed on the at least one load-bearing platform. The carrier vehicle moves back and forth on the running tracks to perform storage and retrieval operations in the container storage system. The track-switching device is configured to (Continued)

switch the carrier vehicle from a current running track where the carrier vehicle is located to a target running track.

14 Claims, 27 Drawing Sheets

(52) U.S. Cl.
CPC ......... *B65G 1/0492* (2013.01); *B65G 1/1373* (2013.01); *B65G 2201/0235* (2013.01)

(56) References Cited

U.S. PATENT DOCUMENTS

| | | | |
|---|---|---|---|
| 6,183,184 B1 | 2/2001 | Shiwaku | |
| 8,628,289 B1* | 1/2014 | Benedict | B65G 1/0478 414/217 |
| 10,189,641 B2* | 1/2019 | Hognaland | B65G 1/06 |
| 10,836,577 B2* | 11/2020 | Fryer | B65G 1/0478 |
| 11,084,655 B2* | 8/2021 | Van Staalduinen | B65G 1/0478 |
| 2019/0308812 A1* | 10/2019 | Lindblom | B65G 1/1375 |

FOREIGN PATENT DOCUMENTS

| | | |
|---|---|---|
| CN | 102173334 A | 9/2011 |
| CN | 107098099 A | 8/2017 |
| CN | 107600862 A | 1/2018 |
| CN | 108584271 A | 9/2018 |
| GB | 1267751 A | 3/1972 |
| JP | S5425073 A | 2/1979 |
| JP | S59134274 A | 8/1984 |
| WO | 2013167907 A1 | 11/2013 |

OTHER PUBLICATIONS

Extended European Search Report of EP application No. 19842268.5 dated Jul. 16, 2021.

\* cited by examiner

THREE-DIMENSIONAL WAREHOUSE SYSTEM

FIELD

The present invention relates to field of logistics warehouse technologies and, in particular, to a three-dimensional warehouse.

BACKGROUND

Existing logistics warehouses or storehouses need to use a large amount of racks. Many of the existing racks are mobile racks equipped with rollers. The mobile racks are arranged on tracks, and are driven by a driving device to move forward and backward on the tracks to transport goods. In order to improve efficiency, the racks are usually arranged in multiple tiers, and goods are placed on each tier. Due to the goods carried on the racks, moving the racks consume a lot of electric energy. In addition, for sorting, loading, unloading and other actions of one certain rack, the entire rack system needs to be activated and moved as a whole, which consumes a lot of energy and especially leads to high ineffective power consumption and low power utilization rate. Each mobile rack often weighs hundreds of kilograms. Therefore, when the mobile racks move as a whole, the loss caused by collision with each other is relatively large, and it has high level requirements for the tracks and the braking system. In the existing rack circulation movement system, steering design of common racks is a rail loop design, that is, turning radius of the rack track is very large, and the rack performs a steering cycle on the turning track. In one of various current designs for the inter-switching of the rack tracks, a lateral moving device is adopted, that is, lateral moving tracks are disposed at both ends of the track, and a rack transfer device is designated to the lateral moving track, and the rack can be transferred to another track by using the transfer device. The rack has a large weight as a multi-tier structure, which leads to lots of power consumption when being transferred to the transfer device. This structure has high level requirements on the load-bearing strength, impact resistance strength and power of the transfer device. For example, Chinese patent application No. 201610955227.0, titled automatic dense warehouse device, and published on Feb. 8, 2017, discloses a warehouse system in which racks are placed on tracks. This kind of rack warehouse system is suitable for a situation where stacks of goods are not high. However, for a situation of higher layer, because the stacking is too high, it may be unsafe during the movement, and the energy loss for ineffective handling is too large.

SUMMARY

The present invention is directed to a solution of high density storage and goods-to-man picking by proposing a three dimensional warehouse system for accurate inbound and outbound operation and management and improved space utilization rate of the warehouse In one aspect, the present application provides a container storage system, which further comprises a rack, a plurality of containers, a carrier vehicle, and a track-switching device. The rack includes a track structure and defines at least one load-bearing platform, the track structure includes a plurality of running tracks, and the at least one load-bearing platform is located below the running track. Each container is configured to store goods, and at least part of the containers is stacked and placed on the at least one load-bearing platform, The carrier vehicle is configured to move forward and backward on the running tracks to perform storage and retrieval operations to containers in the container storage system. The track-switching device is configured to switch the carrier vehicle from a current running track where the carrier vehicle is located to a target running track.

In some embodiments, the track-switching device comprises a transition track and a track-switching vehicle. The transition track is connected with an end of each running track. The track-switching vehicle is located on the transition track and movable forward and backward on the transition track. The track-switching vehicle is configured to receive the carrier vehicle and transport the carrier vehicle along the transition track to the target running track. The current running track and the target running track are two parallel running tracks on the same tier, and the transition track is perpendicular to each running track.

In some embodiments, the rack comprises a plurality of track layers, each track layer is provided with one of the at least one load-bearing platform under it and a plurality of parallel running tracks. The container storage system is equipped with the carrier vehicle and the track-switching device corresponding to each track layer.

In some embodiments, the container storage system includes at least one processor which is used to control operating of the plurality of carrier vehicles and/or track-switching vehicles on the track, control at least one of the plurality of carrier vehicles to store a container containing ordered goods in the container storage system, control at least one of the plurality of carrier vehicles to retrieve at least one container containing ordered goods from the container storage system and deliver the at least one retrieved container to a temporary storage station, and control at least one of the plurality of carrier vehicles to store at least one container containing at least one piece of cargo which comes from at least one retrieved container in the container storage system. The at least one processor is further configured to control at least one of the plurality of track-switching vehicles to transport a corresponding carrier vehicle to the target running track.

In another aspect, the present application provides a method for storing and retrieving a target container in/from a container storage system. The container storage system comprises a plurality of running tracks, a plurality of containers stacked on at least one load-bearing platform, and a plurality of controllable carrier vehicles and a plurality of track-switching vehicles. The container is used to store goods. The method comprises: determining a target storage location of a target container according to order information, controlling at least one carrier vehicle to move along the target running track to above the target container, and loading the target container on the carrier vehicle by means of a grasping mechanism, and then controlling the carrier vehicle loaded with the target container to run along the target running track to above the target storage location and placing the target container in the target storage location. If there is no available carrier vehicle on the track of target container, the processor will give a command which demand that a track-switching vehicle transport an idle carrier vehicle to the track of target container and then drive it to above its location and load it on the carrier vehicle by grasping mechanism. After that, the carrier vehicle eventually gets its container to the target storage location.

If the target container is not at the peak of a stacking tower where the target container is located, controlling one or more carrier vehicles to transfer and place non-target containers stacked above the target container on other stacking tower by means of the grasping mechanism of the carrier vehicle so that the target container is at the peek of the stacking tower, and controlling one carrier vehicle to pick up the target container by means of the grasping mechanism of the carrier vehicle.

In another aspect, a method for storing and retrieving a target container in/from a container storage system, wherein the container storage system comprises a plurality of running tracks, a plurality of containers stacked on at least one load-bearing platform of the container storage system, and a plurality of controllable carrier vehicles and a plurality of track-switching vehicles, the container is configured to store goods. The method comprises: determining a target storage location of a target container according to order information, controlling at least one carrier vehicle to run to above the target container along a target running track, and grasping the target container to the target storage location and stacking it on a stacking tower of the target storage location by means of a grasping mechanism of the carrier vehicle; if the target container is not in the working space of the current running track of the carrier vehicle, controlling one of the track-switching vehicles to transport the carrier vehicle to the target running track above the target container, and then controlling the carrier vehicle to run along the target running track to above the target container and loading the target container on the carrier vehicle by means of the grasping mechanism, and then controlling the carrier vehicle loaded with the target container to run along the target running track to above the target storage location and placing the target container at the target storage location; and if the target storage location is not in the working space of the current running track of the carrier vehicle loaded with the target container, controlling one of the track-switching vehicles to transport the carrier vehicle loaded with the target container to the target running track at the target storage location, and then controlling the carrier vehicle loaded with the target container to run along the target running track to above the target storage location and placing the target container at the target storage location.

If the target container is not at the topmost of the stacking tower, controlling one or more carrier vehicles to transfer and place non-target containers stacked above the target container on other stacking tower by means of the grasping mechanism of the carrier vehicle, such that the target container is at the topmost of the stacking tower, and controlling one carrier vehicle to load the target container on the carrier vehicle by means of the grasping mechanism of the carrier vehicle, and placing the target container at the target storage location.

In the above methods, although the target container is usually transferred to and placed on the top place of the target storage location or the stacking tower, it can also be transferred to and placed on other specific layer of the target storage location or another appropriate location in the stacking tower.

The running tracks can be supported on the columns in the above methods.

In another aspect, the present application provides a three-dimensional warehouse system comprising a rack, multiple layers of load-bearing platforms, and a plurality of carrier vehicles. The rack defines a plurality of track layers arranged in a vertical direction. Each layer of load-bearing platform is located under a corresponding track layer, and multiple containers each configured to store goods are stacked and placed on each layer of load-bearing platform. Each carrier vehicle is suspended under a corresponding track layer and configured to run along running tracks of the track layer to perform storage and retrieval operations to the containers of the three-dimensional warehouse system. Except for the peak track layer, the top of each remaining track layer serves as one of the load-bearing platforms.

In another aspect, the present application provides a suspension grasping device, the suspension grasping device being configured to run along a track. The track comprises double rails, each rail being tubular and having a tube cavity. The suspension grasping device comprises a housing and a grasping mechanism. The housing comprises a walking device and a driving device. The walking device comprises four walking rollers on sides of the housing, and front and rear roller axles, both ends of each roller axle being provided with the rollers. The rollers are configured to walk in the tube cavities of the rails. The driving device is configured to drive the walking device and comprises a driving motor and a belt transmission device. The belt transmission device comprises a first driving pulley and a second driving pulley connected to an output shaft of the driving motor, wherein the first driving pulley is connected to a first driven pulley through a synchronous belt, the second driving pulley is connected to a second driven pulley through a synchronous belt; the first driven pulley and the second driven pulley are respectively sleeved and fixed on the two roller axles. The driving motor drives the first driving pulley and the second driving pulley to rotate, the first driving pulley and the second driving pulley drive their respective driven pulleys to rotate, the driven pulleys in turn drive the roller axles to rotate, and the roller axles rotate to drive the rollers to rotate. The grasping mechanism is arranged under the housing and configured to grasp a goods container in a three-dimensional warehouse system.

In another aspect, the present application provides a track-switching device for switching a carrier vehicle from a first running track to a second running track. The track-switching device comprises a transition track and a track-switching vehicle. The transition track connects ends of the first running track and the second running track together. The track-switching vehicle is located on the transition track and configured to run back and forth on the transition track. The track-switching vehicle comprises: a vehicle body, a moving mechanism installed on the vehicle body, a driving device connected to the moving mechanism and configured to drive the moving mechanism to move and therefore drive the track-switching vehicle to move back and forth on the transition track and docking rails arranged on the vehicle body, and configured to be docked with the first running track and the second running track.

In some embodiments, the container is used to store goods, stacked on the load-bearing platform and adapted to be grasped and transferred to desired locations. In some embodiments, if the lowest layer of tracks acts only as the load-bearing tube but not the tracks, the lowest layer of tracks can be replaced by a planar body. The planar body may be ground, a flat stage, a non-rail tubular bracket that can support the goods containers. If the lowest layer of tracks acts only as the load bearing platform, no carrier vehicle is mounted on the lowest layer of tracks. In this case, the function of the tracks is not fully used. Therefore, the lowest layer of tracks can be replaced by a planar body without the track function. The ground is the simplest example of such planar body. Positioning protrusions may be disposed on the ground, and the containers can be positioned by the positioning protrusions.

In some embodiments, at least two pairs of rails are disposed on the same layer. The end of each pair of rails is provided with the track-switching device. After entering the track-switching device, the carrier vehicle is transferred by the track-switching device to the target pair of rails. If there are three or more than three pairs of rails, the track-switching device can complete track-switching between different pairs of rails, rather than between two adjacent pairs of rails.

In some embodiments, the three-dimensional warehouse system includes two layers of tracks arranged vertically. Different from the above embodiments, the lower track layer acts only as the load-bearing platform and does not have the running track for the suspended carrier vehicle. The upper track layer acts as the running track for the suspended carrier vehicle. Such warehouse has a simple structure. The lower layer of tracks may be replaced by a flat plate, and a floor stacking space for stacking of goods can be formed below the lower layer of tracks or the flat plate. The stacking height can be determined according to needs.

In some embodiments, the three-dimensional warehouse system includes at least three layers of tracks. Among the three layers of tracks, the lowest layer of tracks acts only as the load-bearing platform, and the topmost layer of tracks acts only as the running tracks for the suspended carrier vehicle. The intermediate layer of tracks acts as both the load-bearing platform and the tracks for the suspended carrier vehicle. The tracks of the intermediate layer have the track function as well as the function of bearing the load of the goods containers.

In some embodiments, in the warehouse having three layers of tracks, except for the topmost layer and lowest layer of tracks, each intermediate layer of tracks has the dual functions, i.e. the track function and the load-bearing function. There may be four, five or more layers of tracks. The multiple layers make the track system a three dimensional construction, and the entire warehouse is made a complete and highly efficient three dimensional warehouse. The tracks of the lowest layer have goods container positioning structures for positioning the lowest layer of goods containers and stabilizing the lower part of the rack. The lowest layer of tracks can be replaced by a flat plate, and a floor stacking space for goods can be formed below the lower layer of tracks or the flat plate. The stacking height can be determined according to needs.

In some embodiments, the load-bearing platform may be a flat plate, ground or tracks. The three dimensional rack includes at least one layer of tracks. The goods containers of the first layer (i.e. the lowest layer) may be stacked directly on the flat ground surface, or flat track beams or tracks. The first layer of tracks may be the same as the tracks for the suspended vehicle. The goods containers above the first layer are stacked on the tracks. The topmost layer of tracks acts only as the tracks for the suspended carrier vehicle, and each remaining layer of tracks acts as the load-bearing platform as well as the tracks for the suspended carrier vehicle. The load-bearing platform may be a flat plate or tracks. In certain special cases, the load-bearing platform is the ground, i.e. the goods containers are placed on the ground.

In some embodiments, the cross section of each load-bearing tube is in the shape of a square, a circle or oval with a notch.

In some embodiments, a side of the load-bearing tube where the notch is defined is an inner side of the load-bearing tube, and the inner side comprises a first side portion located above the notch and a second side portion located below the notch, and carrier vehicle positioning holes are set in any one of the first side portion and the second side portion.

In some embodiments, the top of the each load-bearing tube is provided with a top protrusion for positioning the container. With the goods container being positioned, it can be easily assigned coordinates such that the carrier vehicle can accurately locate it.

In some embodiments, the two load-bearing tubes of each pair of load-bearing tubes are connected together by cross beams, and the cross beams are fixed on the top of the load-bearing tubes and are fixed on the columns.

In some embodiments, each cross beam continuously fixes a plurality of pairs of parallel load-bearing tubes, and both ends of each cross beam are respectively fixed on two of the columns. Multiple cross beams are arrange in parallel, which divide the plurality of pairs of parallel load-bearing tubes into multiple container storage areas. A control system may assign coordinates to the storage areas, such that the carrier vehicle can find the corresponding goods container.

In some embodiments, the transition track and/or the docking rails comprise two grooved rails facing to each other, with notches formed in inner sides of the grooved rails. The grooved rail is tubular, and each grooved rail comprises a second tube cavity for a roller to roll in it. Each grooved rail is provided with a second notch along an axial direction of the tubular rail for the roller to insert, and the second notch extends along an axial direction of the tube cavity.

In some embodiments, the docking rails are docked with a docking rail base that is fixed on the second vehicle body, the docking rails are movably connected with the docking rail base, the docking rails are connected with a docking rail driver, and the docking rail driver is configured to drive the docking rails so that the docking rails can move back and forth on the docking rail base.

In some embodiments, a sliding block is provided on an outer side of each docking rail, the docking rail base comprises a sliding groove, and the sliding block is located in the sliding groove of the docking rail base.

In some embodiments, an alignment positioning sensor is provided between the docking rails and the running track.

In some embodiments, a fixing device for the carrier vehicle is provided on the second vehicle body.

In some embodiments, the moving mechanism comprises a roller device, the roller device comprises vertical rollers and horizontal rollers disposed in the transition track, wherein the vertical rollers roll in the bottom of the transition track, and the horizontal rollers roll on inner side walls of the transition track.

In some embodiments, the moving mechanism comprises a two-axle roller assembly and a roller driving device, the roller driving device comprises a motor and a transmission pair which connects the roller driving device and roller axles, both ends of each roller axle are provided with rollers, the roller driving device drives the roller axles to rotate through the transmission pair, and the roller axles drives the rollers to rotate.

In some embodiments, the transmission pair is a belt transmission device, the belt transmission device is drivingly connected to the two axles, the motor drives belts on the belt transmission device, the belts drives the two axles to rotate, and the axles in turn drive the rollers to rotate.

In some embodiments, the fixing device for the carrier vehicle is arranged on a side of the track-switching vehicle, and comprises a fixing device motor, a compactor and a retractor, wherein the retractor connects the fixing device motor and the compactor. The compactor is configured to urge the side of the carrier vehicle, and the fixing device motor adjusts the forward and backward action of the compactor through the retractor.

In some embodiments, the compactor is a friction plate with an uneven surface, a magnet or friction resin.

In some embodiments, the side of each docking rail where the notch is defined is an inner side of the docking rail, the inner side comprises a first side portion located above the notch and a second side portion located below the notch, and track-switching vehicle walking positioning holes are provided on either side portion, a positioning sensor corresponding to the track-switching vehicle positioning hole is provided on the track-switching vehicle, and the positioning sensor is fixed on the track-switching vehicle and located in the second tube cavity of the transition track.

In some embodiments, the two docking rails are connected by a docking rail connecting piece, the docking rail connecting piece is drivingly connected to an electric actuator, and the electric actuator is connected to an actuator motor, the actuator motor drives the electric actuator to make a telescopic movement, and the electric actuator in turn drives the docking rail connecting piece to move back and forth. (27)

In some embodiments, the temporary workstation may be mounted on rollers, a belt assembly line or automated guided vehicle (AGV).

In some embodiments, the horizontal rollers are spring-loaded rollers.

In some embodiments, the grasping mechanism comprises a gripper rotation device and a lifting device; the lifting device comprises a lifting platform, a lifting belt and a lifting driving device for the lifting belt; and the gripper rotation device comprises a gripper, a gripper driving device and a gripper platform; the gripper driving device is disposed on the gripper platform, the gripper is disposed on the side of the gripper platform, the part of the gripper that grasps the goods is free which extends out of the gripper platform to under the platform, and a fixed end of the gripper is fixed on the gripper rotation shaft, the gripper rotation shaft is connected with the gripper driving device, and the driving device drives the gripper rotation shaft to rotate, thereby driving the gripper to rotate. The lifting driving device is arranged on the lifting platform, the lifting platform is located above the gripper platform, the lifting driving device is connected to the gripper platform through the lifting belt, a lower end of the lifting belt is fixed on the gripper platform, and an upper end of the lifting belt is disposed on the lifting driving device, the lifting driving device drags the lifting belt to move up and down, and the lifting belt drives the gripper platform to move up and down.

In some embodiments, the gripper rotation device comprises a gripper rotation motor, a transmission shaft, a gripper rotation shaft and the gripper. The gripper rotation motor is in transmission connection with the transmission shaft, both ends of the transmission shaft are provided with gripper rotation shafts, the transmission shaft is in transmission connection with the gripper rotation shaft, the gripper is mounted on the gripper rotation shaft, the gripper rotation motor drives the transmission shaft to rotate, the transmission shaft drives the gripper rotation shafts at both ends to rotate, the gripper rotation shaft drives the gripper to rotate, and the gripper rotates to realize the action of grasping and releasing the container loaded with goods.

In some embodiments, the lifting device is a belt, and a lower end of the belt is fixed on the gripper platform. The lifting driving device is in transmission connection with a winder, and the upper end of the belt is fixed on the winder. Alternatively, the lifting belt may be a flexible steel strip or steel rope.

In some embodiments, a lifting belt, a winder, and a lifting driving device together form a lifting unit, and the lifting device comprises four lifting units.

In some embodiments, both ends of the gripper rotation shaft are provided with the grippers, and the two grippers act synchronously with the gripper rotation shaft.

In some embodiments, a gripper angle detecting sensor is provided beside the gripper.

In some embodiments, a position sensor for sensing the contour of the container is provided on an edge of the gripper platform.

In some embodiments, the containers used to store goods are placed on the load-bearing platform under the tracks. For the load-bearing platform acting as the tracks, the container is placed on two load-bearing tubes. The load-bearing rubes support the container at two sides of the container. For the load-bearing platform acting as the load-bearing tubes, a row of containers is placed under the pair of rails, and there are no side-by-side rows of containers. However, for the construction in which the load-bearing platform is the ground or a flat surface, containers can be arranged in parallel rows.

In some embodiments, a floor stacking space for the goods is formed below the load-bearing platform. The load-bearing platform may be a flat plate, rails or other bearing platform. The floor stacking space is defined below the bearing platform. The floor stacking space allows for the storage of carrier vehicles, handcart, or goods directly placed on the ground. In the floor stacking space, the containers are transferred by using forklifts or carts or manually. The floor stacking space is for storage of goods or items. In the system as constructed above, its lower part can allow for storage and transferring of goods in a traditional way. Above the load-bearing platform, the carrier vehicle can be used to store and retrieve goods. Such arrangements make the warehouse highly flexible and more functional. For goods that are not suitable for storing in containers, the goods can be placed on the ground to be transferred by using the traditional forklifts. For goods that can be stored in the containers, the priority can be given to the track system above the load-bearing platform to handle the goods. The structure enables the warehouse to handle a wider range of goods and store a larger range of sizes of the goods. The floor stacking space can be formed in a three dimensional rack having two layers of tracks, having three layers of tracks, or having even more layers of tracks.

In addition, the track-switching device in some embodiments of the present disclosure adopts a suspension structure which includes the transition track and the track-switching vehicle suspended on the transition track. The transition vehicle includes docking rails that matches with the running tracks for receiving the carrier vehicle, and the received carrier vehicle is transferred to a corresponding running track. Such structure is designed based on the track structure of the suspended carrier vehicle, which can successfully achieve quick switch between different tracks and steering of the carrier vehicle.

In some embodiments of the present disclosure, the suspended carrier vehicle needs only transfer a container loaded with goods, but doesn't need to move the whole rack, which can effectively increase the transfer efficiency, reduce invalid transfer (i.e. transfer of goods that do not need to transfer), and hence reduce the energy consumption. The two-axle synchronous driving structure of the present disclosure is simple, which can be stably operated on the tracks and facilitate the provision of the suspended grasping structure at the lower part of the carrier vehicle for grasping and transferring of a container. This structure can drive two roller axles by using one drive device, i.e. a two-axle drive. This structure can provide the vehicle on the track with sufficient power and evenly distribute the force the carrier vehicle bears after loaded, which facilities the accurate control and management of the vehicle on the tracks. This system can increase the accuracy of moving of the vehicle as well as the signal collecting accuracy of the sensors on the vehicle or the tracks.

BRIEF DESCRIPTION OF THE DRAWINGS

In order to more clearly describe the technical solutions of embodiments of the present invention, the figures used in the description of the embodiments are briefly described below.

FIG. 1-2 is a perspective view of the load-bearing tubes of FIG. 1-1.

FIG. 1-3 is a front view of the inner side of one load-bearing tube.

FIG. 1-4 shows a pair of load-bearing tubes used as a track.

FIG. 1-5 shows connection between the load-bearing tube and a cross beam.

FIG. 1-6 is a front view of the connection between the load-bearing tube and the cross beam.

FIG. 1-7 shows a three dimensional rack.

FIG. 2-1 is a front view of track-switching device.

FIG. 2-2 is a side view of FIG. 2-1.

FIG. 2-3 is a vertical view of the structure of FIG. 2-1.

FIG. 2-4 is a perspective view.

FIG. 2-5 is a perspective view of a track-switching vehicle.

FIG. 2-6 is a side view of FIG. 2-5.

FIG. 2-7 is a front view of FIG. 2-5.

FIG. 2-8 is a vertical view of FIG. 2-5.

FIG. 2-9 is a perspective view of an internal structure of the track-switching vehicle.

FIG. 2-10 is a front view of FIG. 2-9.

FIG. 2-11 is a vertical view of FIG. 2-9.

FIG. 2-12 shows docking rails.

FIG. 2-13 is a vertical view of the docking rails.

FIG. 2-14 is a perspective view of cross section between the docking rails and a transition track.

FIG. 2-15 is a perspective view of the docking rails and the transition track.

FIG. 2-16 is a front view of the inner side of a single docking rail and the transition track.

FIG. 2-17 is a bottom view of the track-switching vehicle.

FIG. 3-1 shows a grasping mechanism.

FIG. 3-2 shows a moving mechanism.

FIG. 3-3 is a vertical view of FIG. 3-2.

FIG. 3-4 is a perspective view of the grasping mechanism.

FIG. 3-5 shows an internal structure of the moving mechanism.

FIG. 3-6 shows an internal structure of the moving mechanism.

FIG. 3-7 is a vertical view of a vehicle staying on the track.

FIG. 3-8 is a cross-sectional view of FIG. 3-7.

FIG. 3-9 is a perspective view of FIG. 3-7.

FIG. 3-10 shows the principle of position sensors.

FIG. 4 shows a grasping mechanism.

FIG. 5-1 shows a grapple structure.

FIG. 5-2 shows a grapple structure.

FIG. 6 shows the entire system structure.

FIG. 7 illustrates part of the system components according to one embodiment of a container storage system.

FIGS. 8 to 10 are flow charts of methods for storing and retrieving a target container in/from a container storage system according to various embodiments.

Figure 1:
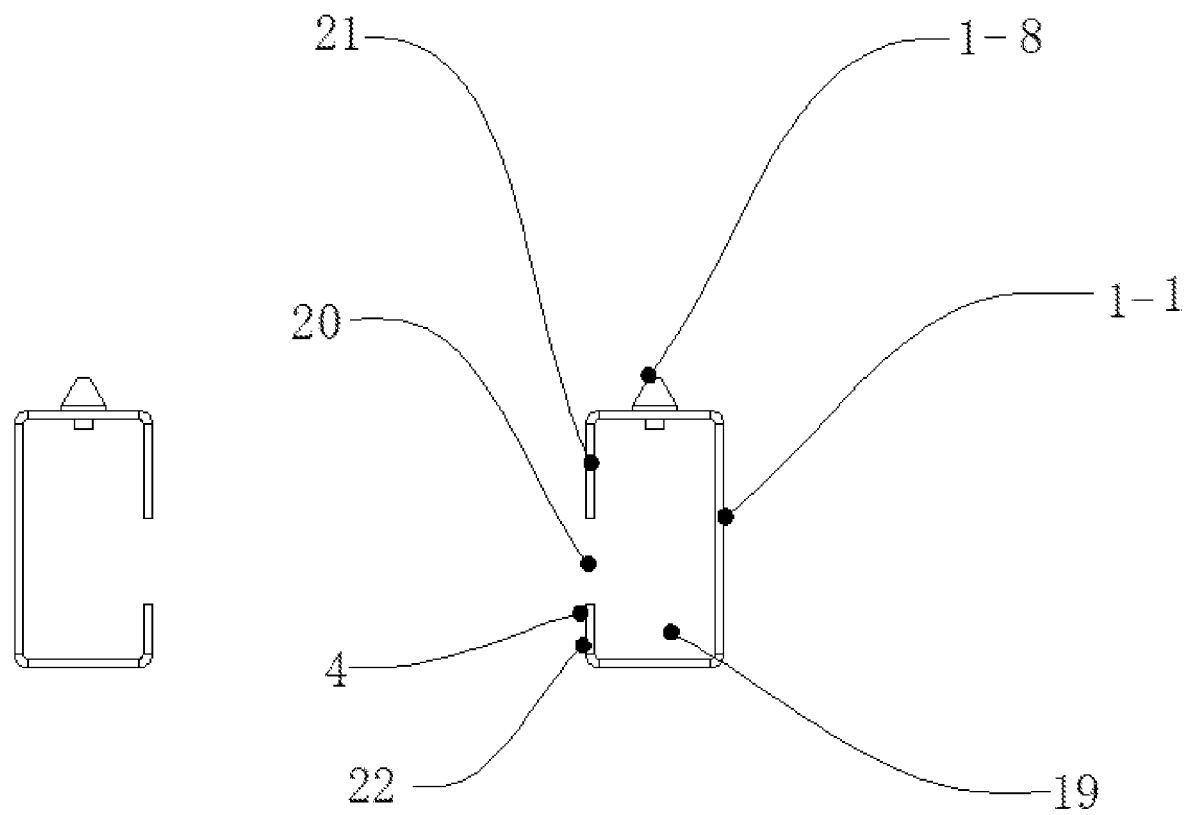
FIG. 1-1 shows a cross section of a pair of load-bearing tubes.

LIST OF ELEMENTS 1-1. Load-bearing tube; 19. Tube cavity; 20. Notch; 26. Inner side; 21. First side portion; 22. Second side portion; 23. Walking positioning holes; 1-8. Top protrusion; 4. Cross beam; 1-10. Hanger; 1-11. Wrapping part; 1-12. Fixing part; 1-13. Top; 1-14. Two sides; 1-15. Reinforcing ribs; 1-16. Connecting piece; 1-17. Connection point; 1-18. Roller structure; 7. Carrier vehicle; 1-20. Cross beam connection holes; 1-21. Tube segment connection hole; 8. Container; 1-23. Container storage area; 1-100. A pair of load-bearing tubes; 1-101. Tube segments; 1-1010. First tube segment; 1-1011. Second tube segment 1. First connector; 2. Hanging beam; 4. Cross beam; 5. Transition track; 6. Docking rail; 7. Carrier vehicle; 8. Goods container; 9. Running track; 10. First pair of rails; 11. Second pair of rails; 12. Second connector; 13. Electric actuator; 14. Track-switching vehicle; 15. Vehicle body; 16. Sliding block; 17. Actuator motor; 18. First moving mechanism; 19. Tube cavity; 20. Notch; 21. First side; 22. Second side; 23. Walking positioning hole; 24. Docking rail base; 25. Docking rail connecting piece; 26. Inner side; 27. Sensing body; 28. Actuator connecting piece; 29. Vertical roller; 30. Horizontal roller; 31. Temporary storage table; 32. First motor; 33. First roller axle; 34. First roller; 35. Belt transmission device; 36. First belt; 37. Sensor; 38. First tensioning roller; 39. Synchronous belt device; 40. Second belt; 41. Driving pulley; 42. Second roller axle; 43. Fixing device motor; 44. Compactor; 45. Retractor; 46. Docking rail positioning sensor; 47. Carrier vehicle roller; 48. fixing device motor base; 450. Connecting part; 440. Contact plate; 300. Guide post; 301. Spring body 3-1. Suspension grasping device; 3-2. Rails; 8. Container; 3-4. Column; 3-5. Container grasping device; 3-6. Second moving mechanism; 3-7. Housing; 3-8. Second roller; 3-9. Adjustable guide roller; 3-10. Fixed guide roller; 3-11. safety contact edge; 3-12. Positioning sensor; 3-13. Front roller axle; 3-14. Rear roller axle; 3-15. Driving motor; 3-16. First driving pulley; 3-17. Second driving pulley; 3-18. First synchronous belt; 3-19. Second synchronous belt; 3-20. First driven pulley; 3-21. Second driven belt; 3-22. Reducer; 3-23. Second tensioning roller; 3-24. Bearing; 3-25. Bearing seat; 19. Tube cavity; 20. Notch; 21. First side portion; 22. Second side portion; 3-30. Battery; 23. Walking positioning hole 4-1. Grapple flat plate; 4-2. Lifting shaft; 4-3. Grapple fixing block; 4-4. Grapple plate; 4-5. Bevel gear; 4-6. Copper bearing; 4-7. Power shaft; 4-8. Belt pressing plate base; 4-9. Belt pressing plate; 4-10. Guide post base; 4-11. Guide post; 4-12. First sensor bracket; 4-13. Motor base; 4-14. Second motor; 4-16. Sensing block; 4-17. Sensor sensing sheet; 4-18. Second sensor bracket; 4-19. Positioning guide sleeve; 4-20. Interference guide post; 4-22. Lifting belt; 4-23. Proximity switch 5-1. First grapple sensor; 5-2. Second grapple sensor; 5-3. Grapple sensing sheet; 5-4. In-place sensor; 5-5. First goods container positioning sensor; 5-6. Second goods container positioning sensor; 5-7. Third goods container positioning sensor; 5-8. Goods container positioning sensor block; 8.

Goods container; 4-23. Proximity switch; 5-11. Grapple; 4-5. Bevel gear; 4-3. Grapple fixing block; 5-14. Sensor bracket; 4-2. Lifting shaft

6-1. Three dimensional rack; 6-2. Track-switching device

DESCRIPTION OF THE EMBODIMENTS

In order to make the objectives, technical solutions, and advantages of the present invention more apparent, embodiments of the present invention will be described in further detail below in conjunction with the accompanying drawings.

The present invention proposes a three-dimensional warehouse system, which is mainly composed of several main modules such as a three-dimensional rack, carrier vehicles, and track-switching devices. Under the control of a processor or a control device, the carrier vehicle can move on a track of the rack, and a track-switching action between different running tracks can be realized through the track-switching device. At the same time, the carrier vehicle can also perform loading, unloading, sorting and other actions at any position on the track or on the track-switching device, and when these actions are performed, a container for containing goods is placed on a temporary placement plate or a similar workstation. The container is grasped by and hangs under the carrier vehicle. The carrier vehicle hangs under the track.

Some embodiments of the three-dimensional warehouse system adopt the following technical solutions. It includes at least one layer of tracks for hanging and moving of the carrier vehicle. The tracks serve as the running tracks of the carrier vehicle, and a load-bearing platform is provided under the tracks.

Each track includes two load-bearing tubes. Each single load-bearing tube is tubular, and includes a tube cavity for a roller to roll in it. Each single load-bearing tube is provided with a notch along the axial direction of the elongated tube for the roller to insert, and the notch extends along an axial direction of the tube cavity. The notches of the two load-bearing tubes are arranged facing to each other, and the two load-bearing tubes are arranged in parallel to form a pair of load-bearing tubes. The top of the load-bearing tube is a part for bearing load of the goods, the top of a pair of load-bearing tubes is used to support the goods. The three-dimensional rack also includes columns, and one pair of load-bearing tubes is indirectly or directly fixed on the columns, that is, the track is fixed on the columns.

The carrier vehicle includes a first moving mechanism and a grasping mechanism. The first moving mechanism includes a first roller, and the first roller is placed in the tube cavity and rolls in it. The grasping mechanism is located under the track and includes a gripper for grasping goods. The carrier vehicle is suspended between the two load-bearing tubes of the track and walks between them while suspended.

In the following, each module is separately described to illustrate the technical solution of the present invention.

The three-dimensional rack module of the present invention is mainly composed of rails, columns, cross beams and other components. The rails are the rack load-bearing tubes, which serve not only as the tracks for the carrier vehicle, but also as a resting platform for containers, namely the containers used to hold the goods, and two rails are used for supporting opposite sides of the container. Two load-bearing tubes which are arranged in parallel to each other, with the notches of which face to each other, form a pair of load-bearing tubes, and the pair of load-bearing tubes are connected together by cross beams. Each cross beam is fixed at the top of each load-bearing tube. The three-dimensional rack also includes columns, the pair of load-bearing tubes are fixed on the columns to form a layer of load-bearing tubes, and at least one layer of load-bearing tubes are provided at different heights of the columns. Multiple layers of load-bearing tubes are arranged longitudinally along the columns, which enable vertical expansion and space utilization improvement of the rack.

Figures 1, 2:
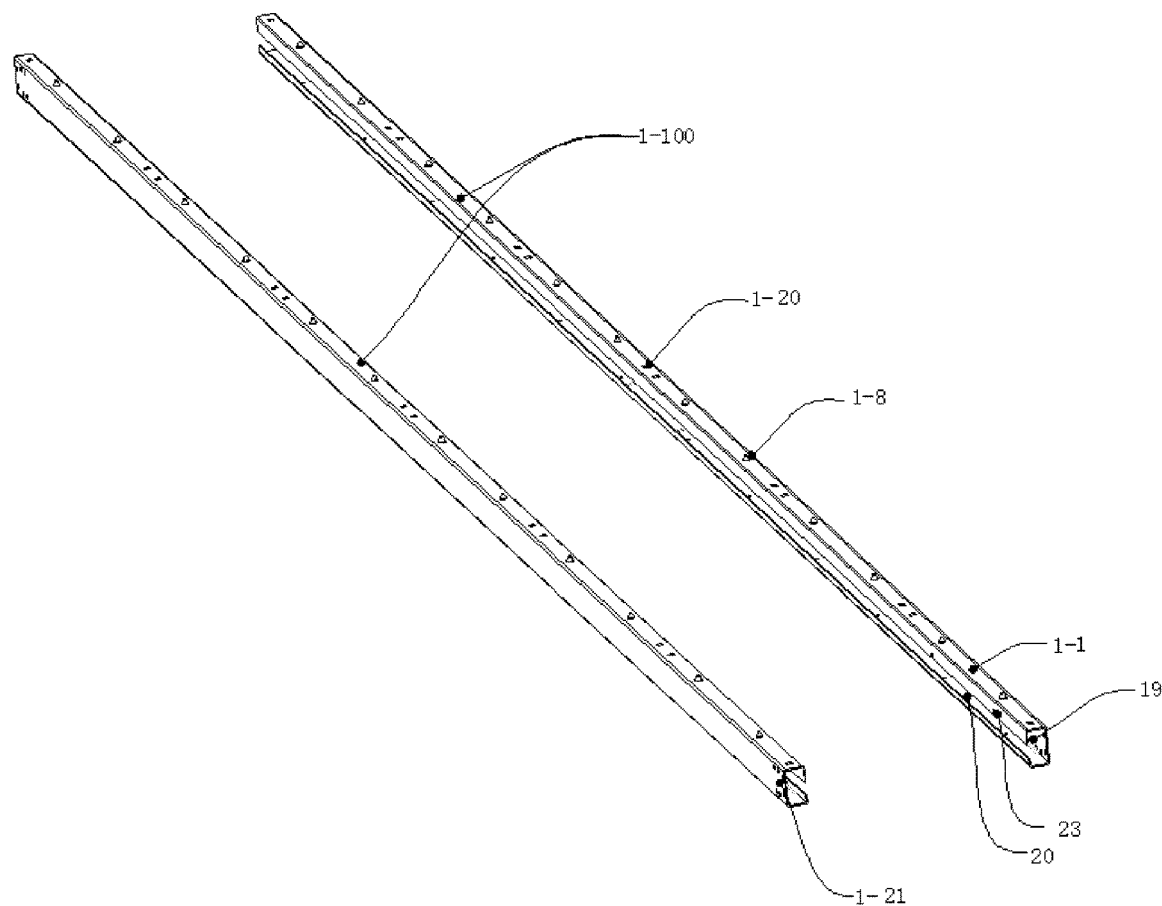

Referring to FIGS. 1-1 and 1-2 which show the rack load-bearing tube, each load-bearing tube 1-1 is an elongated tube which includes a tube cavity 19 for a roller to roll in it. Each load-bearing tube is provided with a notch 20 along an axial direction of the elongated tube for allowing the roller to be inserted into the tubular cavity 19, and the notch extends along the axial direction of the tube cavity. Two load-bearing tubes, namely a pair of load-bearing tubes 1-100, have their notches face to each other. They form a pair of rails on which a carrier vehicle can travel. At the same time, the two load-bearing tubes are used for supporting goods or containers at two ends thereof. The cross-section of each load-bearing tube is a square shape with a notch, which resembles a shape of C or letter C. In other embodiments, the cross-section of each load-bearing tube is in the shape of a circle, an ellipse, an equilateral polygon, etc., with a notch.

Figures 1, 2, 3:
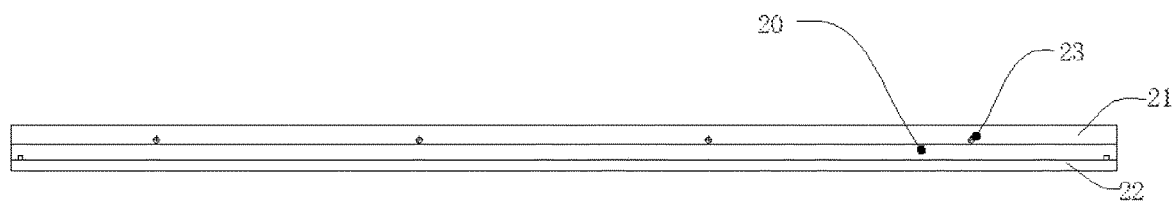

A side of each load-bearing tube where the notch is defined is an inner side 26 of the load-bearing tube. The inner side 26 includes a first side portion 21 located above the notch and a second side portion 22 located below the notch. Referring to FIGS. 1-2 and 1-3, vehicle walking positioning holes 23 are provided in the first side portion 21. The first side portion and the second side portion are used to limit the roller in the tube cavity to prevent it from slipping out. The vehicle walking positioning holes 23 allow for monitoring of operations of a vehicle and are mainly used to position a vehicle. A sensor is installed on the vehicle, and the sensor determines a coordinate position of the vehicle on the load-bearing tube by sensing the vehicle walking positioning holes.

On the top of the load-bearing tube, there is a top protrusion 1-8 for positioning the container. A hole corresponding to the top protrusion is provided on the container. This structure is used for positioning a container at a fixed position, which facilitates the vehicle grasping the container accurately and quickly. In the illustrated embodiment, the top of the load-bearing tube is a flat top rather than a curved dome. The flat top can increase the contact area between the container and the load-bearing tube, thus reducing the pressure therebetween.

Referring to FIGS. 1-5 and 1-6, two load-bearing tubes facing each other are arranged in parallel, and are connected together by cross beams 4. The cross beam 4 is fixed on the top of each load-bearing tube. The cross beam 4 is fixed on the load-bearing tube by a hanger 1-10, the hanger 1-10 is attached around the top and opposite sides of the top of the cross beam, and a lower part of the hanger is fixed on the load-bearing tube. The hanger 1-10 includes a load-bearing tube wrapping part 1-11 and a fixing part 1-12 under the wrapping part. The wrapping part 1-11 is sleeved on the load-bearing tube, and the fixing part 1-12 is fixedly connected to the top of the load-bearing tube by bolts. The cross beam includes a top 1-13 of the cross beam and two sides 1-14 of the top, and axial groove-like reinforcing ribs 1-15 are provided on both sides. The reinforcing ribs are arranged at the middle areas of the sides.

Each load-bearing tube 1-1 is formed by splicing multiple tube segments 1-101, and two adjacent tube segments are connected together by a connector 1-16. The connector 1-16 is fixedly connected to the two tube segments by bolts, and is in the form of a sheet or a wrapping plate, which is arranged on an outer wall of the load-bearing tube. Referring to FIG. 1-6, a connection point 1-17 between the cross beam 4 and the load-bearing tube is also a connection point between two tube segments, and fixing parts on opposite sides of the hanger 1-10 for the cross beam are respectively connected to a first tube segment 1-1010 and a second tube segment 1-1011. The hanger 1-10 and the connector are two different parts, but in other embodiments, they may be formed as an integral structure or a conjoined structure, which can reinforce the strength of the assembled structure. In another embodiment, the cross beam and the load-bearing tube can also be connected by other connection means such as welding, bolted connection without hanger, and so on.

Referring to FIG. 1-2, the top of the load-bearing tube is also provided with beam connection holes 1-20, and a side opposite to the side with the notch is provided with tube segment connection holes 1-21.

The three-dimensional rack is shown in FIG. 1-7, the three-dimensional rack is mainly composed of load-bearing tubes, cross beams and columns. The load-bearing tubes include a pair of load-bearing tubes, which are used for bearing load of the container and used as the rails of the carrier vehicle, which have two functions, high efficiency and simple structure design.

A pair of load-bearing tubes 1-101 is indirectly fixed on the columns 3-4 through cross beams 4 to form a layer of load-bearing tubes. There are multiple layers of load-bearing tubes at different heights of the columns. Generally, it can have one to ten layers, and the number of the layers can be determined by considering various factors such as the height of the storehouse, the load-bearing capacity of the rack, the weight type of the goods, the number of layers of containers on each layer of load-bearing tubes. A structure with one hundred layers of load-bearing tubes is also possible. In FIG. 1-7, a four-layer structure of load-bearing tubes is illustrated, with five layers of containers on each layer of load-bearing tubes. There are multiple pairs of load-bearing tubes arranged side by side on the same layer of load-bearing tubes. In the example illustrated in FIG. 1-7, there are four pairs of load-bearing tubes arranged side by side. However, in actual design, the number of the pairs of the load-bearing tubes can be determined according to the footprint of the storehouse. The number of the side-by-side pairs is usually 2-100, though it can be more than one hundred.

Each cross beam 4 continuously fixes multiple pairs of side-by-side load-bearing tubes. Opposite ends of each cross beam 4 are respectively fixed on the columns 3-4, and multiple cross beams are arranged in parallel, which laterally divide multiple pairs of side-by-side load-bearing tubes into multiple container storage areas 1-23. Each layer of load-bearing tubes is divided into multiple container storage areas by the cross beams. The top protrusions are located in the container storage areas. The top protrusions are used to improve the placement accuracy of the containers.

The whole area of the rack is divided into multiple container storage areas to facilitate the coordinate management of the containers in the storage areas. Each storage area can be assigned a coordinate or a range of coordinates, which facilitates accurately recognizing and transferring a specified container and assigning a position value to the location of the container. Since the rack is a three-dimensional structure, the containers on it also need to be positioned in three dimensions, so the locations of the goods containers can be assigned values in an XYZ coordinate system, so that the carrier vehicle on the load-bearing tube can accurately grasp the goods containers.

Referring to FIGS. 1-4 and 1-7, the carrier vehicle 7 includes a roller structure 1-18, and the roller of the roller structure 1-18 is inserted into the tube cavity from the notch 20, and it can move in the tube cavity. The carrier vehicle 7 hangs under an upper layer of load-bearing tubes and moves under it. Multiple layers of containers 8 are stacked on a lower layer of load-bearing tubes (for the first layer of load-bearing tube, the multiple layers of goods containers are placed on a flat ground or platform). The carrier vehicle can grasp the container and move the container axially along the load-bearing tubes. The rack with multi-layer structure can store several or even tens of layers of containers. A large amount of goods can be stored, the goods can be transferred in time, and each container storage area can realize accurate monitoring and management of containers.

Therefore, in some embodiments, the rack has multiple layers of tracks and defines at least one load-bearing platform, and several layers of containers 8 are stacked on the load-bearing platform. Each track layer can hang the carrier vehicles under them, and except for the topmost track layer, the top of the running rails of each remaining track layer serves as one of the load-bearing platforms. The ground below the lowest track layer can also serve as a load-bearing platform.

The track-switching device module of the present invention includes a transition track for connecting the ends of the running rails together, and a track-switching vehicle on the transition track where the vehicle is capable of moving back and forth. The track-switching vehicle includes a vehicle body, on which a moving mechanism is installed. The moving mechanism is connected with a driving device, and the moving mechanism is driven by the driving device to drive the track-switching vehicle to move back and forth on the transition track. The track-switching vehicle is also provided with docking rails that can be docked with the running rails of the carrier vehicle. The docking rails are disposed on the vehicle body.

Referring to the structural diagrams shown in FIGS. 2-1 to 2-4, the track-switching device of the three-dimensional warehouse is mainly composed of a transition track 5 used to connect the ends of the running rails 9 together and a track-switching vehicle 14 on the transition track which is capable of moving back and forth thereon. The carrier vehicle 7 hangs under the track-switching vehicle 14, and a container 8 is grasped and hangs under the carrier vehicle 7.

The track-switching vehicle 14 includes a vehicle body 15 on which a first moving mechanism 18 is installed. The first moving mechanism 18 is connected with a driving device, and is driven by the driving device to drive the track-switching vehicle to move back and forth on the transition track. The track-switching vehicle is also provided with docking rails 6 that can be docked with the running rails of the carrier vehicle. The docking rails 6 are disposed on the vehicle body 15.

The transition track 5 is formed by lateral moving rails, which are arranged perpendicularly to the running rails 9. Referring to FIGS. 2-14, 2-15 and 2-16, the rails of the transition track 5 are grooved rails each with a notch at its inner side thereof. Each grooved rail is in the form of an elongated tube, and includes a tube cavity 19 for a roller to roll in it. Each grooved rail is provided with a notch 20 along the axial direction of the elongated tube for the roller to insert, and the notch extends along an axial direction of the tube cavity. The lateral moving rails includes two grooved rails, and their notches are arranged facing to each other. They form a pair of rails on which the track-switching vehicle 14 can travel. The cross-section of each grooved rail is in the shape of a square including a notch, which resembles the shape of C or letter C. In other embodiments, the cross-section of each grooved rail is in the shape of a circle, an ellipse, an equilateral polygon, etc. with a notch. The side of each grooved rail where the notch is defined is the inner side of the grooved rail. The inner side includes a first side portion 21 located above the notch and a second side portion 22 located below the notch, and vehicle walking positioning holes 23 are provided on the first side portion 21. The first side portion and the second side portion are used to limit the roller in the tube cavity to prevent it from slipping out. The vehicle walking positioning holes 23 is used to monitor operations of the vehicle and mainly to position it. Referring to FIGS. 2-5 and 2-6, a sensor 37 is installed on the track-switching vehicle, arranged on the side of the track-switching vehicle and fixed relative to the roller device. The sensor 37 goes deep into the tube cavity 19 and determines the coordinates of the vehicle on the rail by sensing the vehicle walking positioning holes 23. The sensor can be a photosensitive infrared sensor. When the vehicle passes by the walking positioning hole, the light emitted by the sensor's light-emitting device passes through the corresponding hole, and the sensor's receiver receives the light signal, thereby completing a location recording. The vehicle walking positioning hole 23 may be a complete hole located on the first side portion 21 or the second side portion 22, or a cutout communicating with the notch 20. The vehicle walking positioning hole 23 can be of any proper shape, for example, a circle, square, etc.

The shape and structure of the docking rails 6 are the same as those of the transition track 5. The transition track 5 and the docking rails 6 are both grooved rails with openings on their inner sides. The grooved rails are tubular, and each grooved rail includes a tube cavity 19 for a roller to roll in it. Each grooved rail is provided with a notch 20 along the axial direction of the elongated tube for the roller to insert, and the notch extends along an axial direction of the tube cavity. The grooved rails include two rails, and their notches are arranged facing to each other. The two grooved rails are arranged in parallel. The top of each grooved rail is also provided with cross beam connection holes, and tube segment connection holes are provided on the side opposite to the side with the notches.

The transition track 5 is connected to the ends of at least two running rails. FIG. 2-3 shows that four pairs of running rails are arranged side by side and the transition track 5 is docked with the four pairs of running rails. However, in other embodiments, it is not limited to four pairs, it can be two, three or five to twenty pairs, which are all good designs. More pairs require larger footprint, so more side-by-side pairs can be added according to current place. The running rails 9 include a first pair of rails 10 and a second pair of rails 11. An example of track switching is as follows: when the system is running, the carrier vehicle enters the track-switching vehicle 14 on the transition track from the first pair of rails 10, and then is moved laterally by the track-switching vehicle to the end of the second pair of rails 11; after the docking rails are aligned with the running rails, the carrier vehicle enters the second pair of rails 11 from the transition track, thereby completing one track-switching action. The carrier vehicle usually carries a container, and transferring of the container is completed through the above-mentioned track switching.

As shown in FIG. 2-2, the docking rails 6 is connected to a docking rail base 24, and the docking rail base 24 is fixed on the vehicle body 15. The docking rails 6 are movably connected to the docking rail base 24, and the docking rails are connected to a docking rail driver which drives the docking rails so that the docking rails can move back and forth on the docking rail base.

The docking rails are driven as follows. Referring to FIGS. 2-5 and 2-12, two opposite docking rails are connected by a docking rail connecting piece 25, the docking rail connecting piece 25 is drivingly connected to an electric actuator 13, and the electric actuator 13 is connected to an actuator motor 17. The actuator connecting piece 28 is fixed on the docking rail connecting piece 25, and the actuator connecting piece 28 is connected with the electric actuator 13. The actuator motor 17 drives the electric actuator 13 to make a telescopic movement, the electric actuator 13 in turn drives the actuator connecting piece to move, the actuator connecting piece drives the docking rail connecting piece to move back and forth, and the docking rail connecting piece drives the docking rails to move back and forth.

Referring to FIGS. 2-2 and 2-12, a carrier vehicle roller 47 is disposed inside each docking rail, a sliding block 16 is provided on the outer side of the docking rail, and the sliding block 16 serves as a guide. The docking rail base 24 includes a sliding groove, and the sliding block 16 is located in the sliding groove of the docking rail base. An alignment positioning sensor 46 is provided between the docking rails and the running rails. The alignment positioning sensor 46 is provided on the track-switching vehicle 14, and a sensing body 27 is provided at the end of the running rail 9. The alignment positioning sensor is used to monitor rail alignment between the track-switching vehicle and the running rails.

A fixing device used to fix the carrier vehicle is disposed on the vehicle body. After the carrier vehicle enters the docking rails, it may shake during movement, and the fixing device is used to push the track-switching vehicle and the carrier vehicle together to reduce a gap between them and reduce swing of the carrier vehicle on the track-switching vehicle. Because the carrier vehicle carries the container thereunder, shaking and swing of the carrier vehicle will cause greater lateral force or shearing force on the track-switching device during movement, increasing the risk of failure and weakening the stability of the platform.

Referring to FIG. 2-17, the fixing device for the carrier vehicle is arranged on the side of the track-switching vehicle. The fixing device for the carrier vehicle includes a fixing device motor 43, a compactor 44 and a retractor 45. The retractor connects the fixing device motor and the compactor, and the fixing device motor adjusts the forward and backward actions of the compactor through the retractor. The compactor is preferably plate-like, which minimizes or eliminates the gap between the carrier vehicle and the track-switching vehicle by urging the side of the carrier vehicle. The retractor 45 is preferably a lead screw retractable structure, and an output shaft of the fixing device motor is connected to a gear or worm wheel on the lead screw through a gear or worm wheel, thereby driving the lead screw to rotate. The exposed part of the lead screw is a connecting part 450 which connects the lead screw and the compactor 44. In some embodiments, a screw hole is provided in the middle of the compactor, and it is connected to the lead screw retractor through a thread. The compactor includes a contact plate 440 in friction connection with the carrier vehicle and the connecting part 450 connected to the lead screw. The contact plate extends out by a certain distance from the front end of the connecting part, and the end of the lead screw extends from the connecting part and does not touch the carrier vehicle to avoid affecting the compacting effect of the contact plate. The fixing device motor 43 is installed on a fixing device motor base 48.

The compactor is a friction plate with an uneven surface, or a magnet, or friction resin. In this embodiment, it is a corrugated surface. When the surface of the carrier vehicle is made of iron material, the compactor can be a magnet or an electromagnet device. The friction resin can be of organic material such as tire rubber, silica gel, and plastic.

Referring to FIGS. 2-5, 2-9 to 2-11, the moving mechanism includes a roller device disposed in the transition track. The roller device includes vertical rollers 29 and horizontal rollers 30 in the transition track. The vertical rollers roll on the bottoms of the transition track, and the horizontal rollers roll on the inner side walls of the transition track. The vertical rollers are used to make the track-switching vehicle roll along the rail direction (longitudinal) on the transition track, and the horizontal rollers keep the track-switching vehicle stable in the lateral direction, avoiding obvious friction between the vertical rollers and the transition track which would increase their loss and significant lateral swing of the vehicle. The horizontal rollers 30 are arranged on both sides of the track-switching vehicle, which are fixed on the vehicle body and cooperate with the vertical rollers to move. In this embodiment, each horizontal roller 30 is an elastic roller, that is, it includes a guide post 300 and a spring body 301, wherein two ends of the horizontal roller body are sleeved on the guide post 300, and in the middle is the spring body, the roller body can move up and down along the guide post under elastic force of the spring. In another embodiment, the horizontal roller body can be sleeved on the outer end of the guide post, and on the guide post at the rear of the horizontal roller body, and a spring can be sleeved on the guide post to form an elastic structure. The elastic horizontal roller can buffer and correct deviation when the track-switching vehicle deviates.

Referring to FIG. 2-1, there is also a workstation 31 for placing the container under the track-switching device, the workstation 31 is disposed below the position where the track-switching vehicle is docked with the running rails, or it can be disposed under the running rails. This workstation is used to temporarily store the goods container, used for sorting operation to the goods contained in the container, or as a working platform for loading or unloading the container. The workstation is provided with positioning protrusions or grooves for positioning the containers. The positioning protrusions or grooves are used to, after the container is temporarily stored on the workstation, facilitate the carrier vehicle to locate and accurately grasp the container again. The workstation is also installed on a roller or belt assembly line, or an AGV (the abbreviation of "Automated Guided Vehicle").

Referring to FIGS. 2-9 to 2-11, the moving mechanism includes a two-axle roller assembly and a roller driving device. The roller driving device includes a first motor 32 and a transmission pair. The transmission pair connects the roller driving device and the roller axles. Both ends of each roller axle are provided with first rollers 34. The roller driving device drives the roller axle to rotate through the transmission pair, and the roller axle in turn drives the rollers to rotate.

The transmission pair is implemented as a belt transmission device 35 which is drivingly connected to the two axles. The first motor 32 drives a belt of the belt transmission device 35, the belt in turn drives the roller axles to rotate, and the roller axles in turn drive the first rollers 34 to rotate. A pulley is arranged on each roller axle, gear teeth are arranged on the belt, and the belt drives the axles to rotate, thereby driving the rollers on the axles to rotate.

In this embodiment, the first motor 32 is connected to a driving roller 41. The driving roller is a synchronous belt device 39, on which a first belt 36 and a second belt 40 are provided. When the driving roller rotates, it will drive the first belt and the second belt to move synchronously. The other end of the first belt is connected to the second roller axle 42, and the other end of the second belt is connected to the first roller axle 33. The rollers are on both ends of the roller axles. When the roller axles are driven by the belts, the rollers at both ends of the roller axles rotate with them. A first tensioning roller 38 is also provided on the first belt, and a tensioning roller is also provided on the second belt.

Referring to FIGS. 2-1 to 2-4, the transition track 5 is installed under a hanging beam 2 through a first connector 1, the hanging beam 2 is installed on the cross beam 4 through a second connector 12, the cross beam 4 is located at the outer side of the transition track, and the cross beam 4 is installed on the columns. The columns are used to support the cross beams, running rails and track-switching device.

The track switching process is briefly described as follows.

When the carrier vehicle is about to enter the docking rails 6 from the running rails 9, the alignment positioning sensor 46 transmits sensing information to a power adjustment mechanism of the transition track, that is, the actuator motor drives the electric actuator 13 to push the docking rail connecting piece 25 according to the information from the alignment positioning sensor 46, such that the docking rails 6 performs position adjustment on the docking rail base. After the docking rails 6 are adjusted to be docked with the running rails 9, the carrier vehicle enters the docking rails 6 from the running rails 9. After that, the fixing device motor pushes the compactor to retain the carrier vehicle on the track-switching vehicle. The first motor 32 drives the synchronous belt device, that is, the first belt, the second belt and their accessories to drive the rollers to rotate, so that the track-switching vehicle moves on the transition track 5. After the track-switching vehicle moves to the corresponding running rails, it stops, then the fixing device motor releases the carrier vehicle, the actuator motor pushes the docking rails to be docked with the new running rails, and then the carrier vehicle moves into the new running rails. During the unloading action, the docking rails 6 perform position adjustment on the docking rail base. After the adjustment is completed, the carrier vehicle can place the container on the temporary workstation to complete the unloading action. The track-switching vehicle can also transfer the carrier vehicle to another temporary workstation to release the container. Releasing the container can be an action during unloading, an action during loading, or a sorting action.

The carrier vehicle of the present invention mainly includes a moving mechanism and a grasping mechanism.

The carrier vehicle is a suspension grasping device 3-1. Referring to FIG. 3-1, the suspension grasping device 3-1 runs on a pair of rails 3-2, and on the suspension grasping device 3-1 hangs a container 8 under it. The rails are mounted on the columns 3-4. An upper part of the suspension grasping device 3-1 is a second moving mechanism 3-6, and a lower part thereof is a container grasping device 3-5.

Referring to the structure shown in FIGS. 3-2 to 3-6, the suspension grasping device 3-1 includes a housing 3-7, and the container grasping device 3-5 is disposed under the housing 3-7. The housing 3-7 is provided with the walking device and a driving device of the walking device.

The walking device includes four walking second rollers 3-8 on the sides of the housing, and front and rear roller axles, namely, the front roller axle 3-13 and the rear roller axle 3-14. Both ends of each roller axle are provided with rollers.

Figures 1, 2, 3, 4:
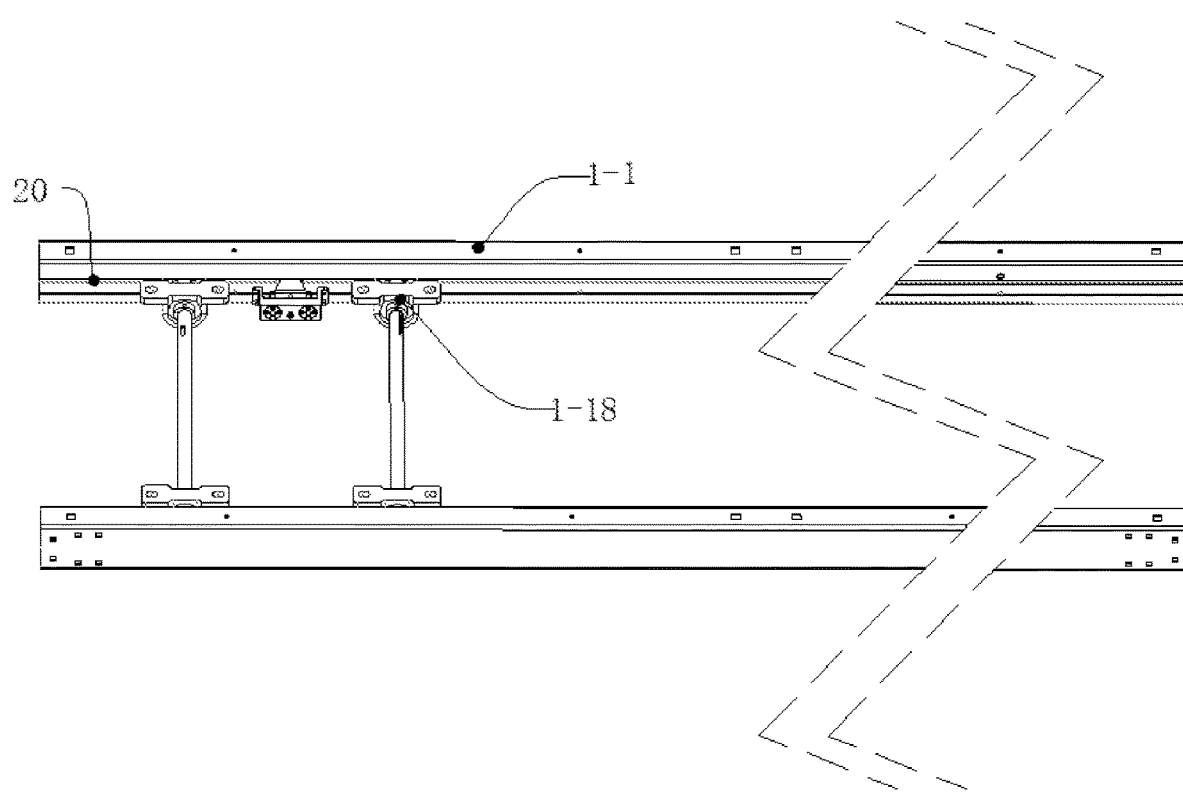
Figures 1, 2, 3, 4, 5:
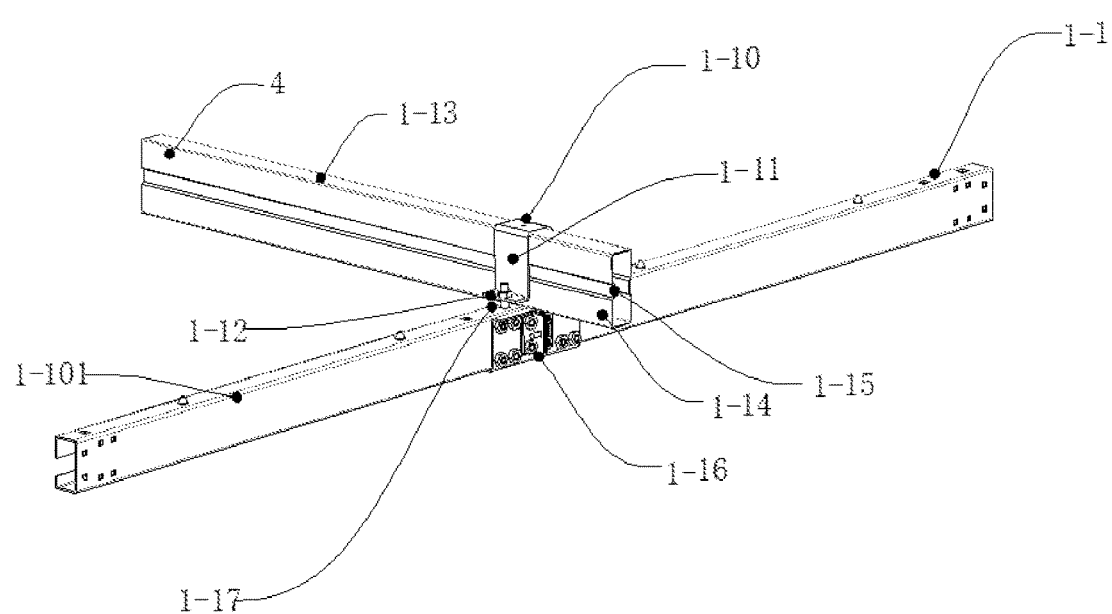
Figures 1, 2, 3, 4, 5, 6:
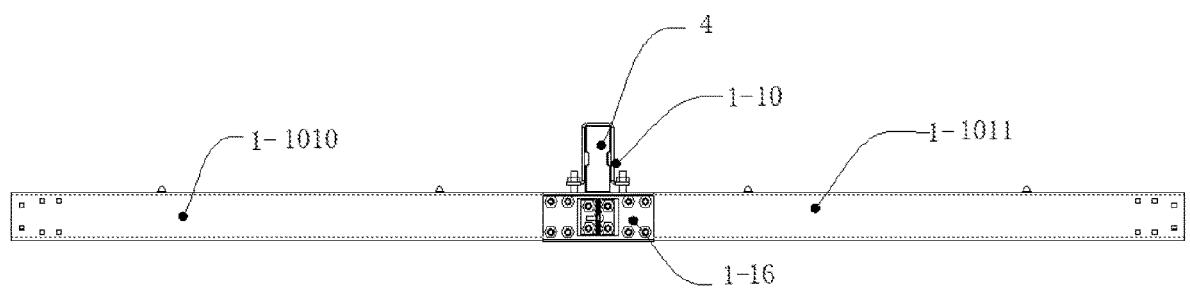

The driving device is connected with the roller axles. The driving device includes a driving motor 3-15 and a belt transmission device. The belt transmission device includes a first driving pulley 3-16 and a second driving pulley 3-17 that are connected to an output shaft of the driving motor. The first driving pulley 3-16 is connected to a first driven pulley 3-20 through a first synchronous belt 3-18, the second driving pulley 3-17 is connected to the second driven pulley 3-21 through a second synchronous belt 3-19. The first driven pulley and the second driven pulley are respectively fixedly attached around the two roller axles. The driving motor 3-15 drives the first driving pulley 3-16 and the second driving pulley 3-17 to rotate through a reducer 3-22 to rotate, and the first driving pulley and the second driving pulley respectively drive the driven pulleys to rotate, which in turn drive the roller axles to rotate. The roller axles, when rotating, drive the rollers to rotate. In this embodiment, the first driving pulley 3-16 and the second driving pulley 3-17 are conjoined coaxially. In the conjoined structure of the first driving pulley and the second driving pulley, a protruding spacer is arranged between them to prevent the two synchronous belts from interfering with each other. The driving motor is powered by a battery 3-30. Referring to FIG. 3-5, the battery 3-30 is disposed in the gap between the two driving shafts and fixed on a battery bracket. In other embodiments, the driving motor may be connected to an active AC power grid or a DC power supply system.

A second tensioning roller 3-23 for tensioning the synchronous belt is provided. The second tensioning roller 3-23 is provided on a tensioning roller base which is fixed on the housing. The height of the tension roller is adjustable, which is used to adjust the intensity of the tension force of the transmission belt.

Horizontally rolling guide rollers are also arranged between the two rollers on the same side of the housing, and the guide rollers are arranged on the housing. The roller axles of the horizontally rolling guide rollers are perpendicular to the roller axles of the rollers. They are vertical rollers, which roll upright on the bottom of the rail, the guide rollers are a horizontal roller, which are horizontally disposed on the vehicle body, and roll on the outer side walls inside the rails.

The guide rollers include a fixed guide roller 3-10 and an adjustable guide roller 3-9. The fixed guide roller 3-10 is fixedly arranged on the housing, and the adjustable guide roller 3-9 is arranged on an elastic device which is fixed on the housing. The fixed guide roller serves to keep the vehicle from derailing, and the adjustable guide roller is provided with an adjustment mechanism to maintain a certain bias force and cooperates with the fixed guide roller. The guide rollers move on the side walls of the rails, and exert walking forces on the side walls, which can make the vehicle move more smoothly on the bottom of the rail, and reduce trembling or trembling amplitude. This structure is used for load-bearing rail structures with an elongated notch at an inner side thereof.

The front roller axle 3-13 and the rear roller axle 3-14 are each connected with a bearing seat 3-25 through a bearing 3-24, and the bearing seat is fixed on the housing. The roller axles can also be directly connected to the housing through the bearing.

The housing is provided with safety contact edges 3-11 protruding from the housing, and the safety contact edges 3-11 are disposed on the front and back sides of the traveling direction of the housing. A sensing device for each safe contact edge is disposed on the rail, which can be used to sense the contour of the vehicle and improve the safety of the vehicle.

A positioning sensor 3-12 for detecting current position of the vehicle is also arranged between the two rollers on the same side of the housing. Referring to FIG. 3-10, the positioning sensor 3-12 is an infrared sensor, which includes an infrared generator and an infrared receiver, one of which goes deep into the tube cavity of the rail, and the other one is located outside the corresponding tube cavity. Positioning holes 3-31 are disposed in the first side portion 21, and the positioning sensor 3-12 can count once every time it passes by one positioning hole 3-31, and the positioning sensor realizes accurate positioning of the carrier vehicle by counting the positioning holes and referring to the motor odometer during traveling at the same time. The sensor can be any type of photogate sensor, infrared reflective sensor or magnetic induction sensor. In other embodiments, the sensor may also be a mechanical contact switch, or the rail holes may be changed to protrusions arranged axially along the rail.

As the carrier vehicle, the suspension grasping device 3-1 needs to run on the rails. Referring to FIGS. 3-1, 3-7 to 3-9, these figures show the conditions of the vehicle on the rails and the moving mechanism of the vehicle on the rails. The rails for the vehicle include double rails. Each rail is tubular and includes a tube cavity 19 for a roller to roll in it. The rail is provided with a notch 20 along the axial direction of the elongated tube for the roller to insert, and the notch extends along an axial direction of the tube cavity. The notches of two rails are arranged facing to each other.

A side of each rail in which the notch is defined is the inner side of the rail, which includes a first side portion 21 located above the notch and a second side portion 22 located below the notch, with vehicle walking positioning holes provided on either of the side portions. In this embodiment, the positioning holes 3-31 are disposed on the first side portion 21. The vehicle walking positioning holes 3-31 can be complete holes located on the first side portion 21 or the second side portion 22, or cutouts communicating with the notch. The positioning holes 3-31 can be of any proper shape, for example, circle, square, etc.

The suspension grasping device walks on the generally C-shaped rails through the moving mechanism, and at the same time grasps and transports the container below. Under the driving of the driving motor 3-15, the front and rear roller axles rotate synchronously, so that the four rollers are moved in the tube cavity 19 of the rails, and the load of the vehicle is more evenly distributed to the four rollers. As the rollers move in the tube cavity, contact between the rollers and the inner sidewalls of the rails may occur. To this end, the guide rollers are provided to solve this problem. Under the action of the guide rollers, the rollers maintain a stable distance from the inner sidewalls of the tube cavity, which can reduce and control the trembling of the vehicle body, increase the stability of the vehicle body, and avoid the undesirable shaking of the container under the vehicle. The invention realizes the four-roller drive of the hanging vehicle, which can provide sufficient power of moving the container, the distribution of power is reasonable, and the structure is simple.

The grasping mechanism includes a gripper rotation device and a lifting device. The lifting device includes a lifting platform, a lifting belt and a lifting driving device for the lifting belt. The gripper rotation device includes a gripper (also termed as a "grapple hook"), a gripper driving device and a gripper platform. The gripper driving device is disposed on the gripper platform at a side thereof. A portion of the gripper that grasps the goods is a free end, which extends beyond and is located below the platform, and a fixed end of the gripper is fixed on a gripper rotation shaft. The gripper rotation shaft is connected with the gripper driving device, and the driving device drives the gripper rotation shaft to rotate, thereby driving the gripper to rotate. The lifting driving device is arranged on the lifting platform, and the lifting platform is located above the gripper platform. The lifting driving device is connected to the gripper platform through the lifting belt. A lower end of the lifting belt is fixed on the gripper platform, and an upper end of the lifting belt is disposed on the lifting driving device. The lifting driving device drags the lifting belt to move up and down, and the lifting belt drives the gripper platform to move up and down. The gripper rotation device includes a gripper rotation motor, a transmission shaft, a gripper rotation shaft and a gripper. The gripper rotation motor is in transmission connection with the transmission shaft, and both ends of the transmission shaft are provided with gripper rotation shafts. The transmission shaft is in transmission connection with the gripper rotation shaft. The gripper is mounted on the gripper rotation shaft, the gripper rotation motor drives the transmission shaft to rotate, the transmission shaft drives the gripper rotation shafts at both ends to rotate, the gripper rotation shaft drives the gripper to rotate, and the gripper rotates to realize the action of grasping and releasing the container. The lifting belt is a belt, and the lower end of the belt is fixed on the gripper platform. The lifting driving device is in transmission connection with a winder, and the upper end of the belt is fixed on the winder. One lifting belt, one winder, and one lifting driving device together form a lifting unit, and the lifting device includes four lifting units. Both ends of the gripper rotation shaft are provided with the grippers, and the two grippers act synchronously with the gripper rotation shaft. A gripper angle detecting sensor is disposed beside the gripper. The edge of the gripper platform is provided with a position sensor for sensing the contour of the container. In other embodiments, the lifting belt may also be implemented as a flexible steel strip or steel rope.

Referring to FIG. 4, the grasping mechanism includes a grapple flat plate 4-1 with a flat surface. The surface of the grapple flat plate 4-1 is provided with a grapple driving device, a position sensing detection mechanism, and a lifting belt. The grapple driving device includes a power shaft 4-7, both ends of the power shaft are engaged with a lifting shaft 4-2 for rotating the grapple. The engagement between the lifting shaft and the power shaft is achieved by bevel gears, and both ends of the lifting shaft 4-2 are installed with grapple fixing block 4-3. The bottom of the grapple fixing block is provided with a grapple plate 4-4 for grasping the container. The outer sides of the grapple flat plate are provided with lifting belts 4-22 connected to the suspension robot. The position sensing detection mechanism is disposed around the lifting belt. The position sensing detection mechanism includes a positioning guide sleeve 4-19 and a guide post base 4-10. The positioning guide sleeve 4-19 is provided therein with an interference guide post 4-20 that is lifted up when interference occurs during operation, a guide post 4-11 is installed inside the guide post base 4-10, the top of the guide post 4-11 is provided with a sensing block 4-16, the sensing block 4-16 is used to trigger a sensor sensing sheet 4-17 near the top of the grapple fixing block 4-3.

In addition, the power shaft 4-7 engages with a spindle of a motor 4-14, and the motor 4-14 is connected and installed on a motor base 4-13 through a fixing part. Both ends of the power shaft 4-7 and the lifting shaft 4-2 are provided with copper bearing 4-6. The curve of the grapple plate 4-4 matches a fastener for grasping the container. The number of grapple plates 4-4 and lifting belts 4-22 are four, two of the four grapple plates 4-4 are in one group, and each group of grapple plates 4-4 is symmetrically distributed on both sides of the grapple flat plate 4-1. A belt pressing plate base 4-8 is installed at the bottom of the lifting belt 4-22, and a belt pressing plate 4-9 is fixed inside the belt pressing plate base 4-8. The sides of the positioning guide sleeve 4-19 and the guide post base 4-10 are provided with a second sensor bracket 4-18. The second sensor bracket 4-18 is L-shaped, and an arc-shaped hole formed in a middle of the second sensor bracket 4-18 is provided with a proximity switch 4-23 to confirm whether the grasping platform has reached a limit position when retracted.

The grapple driving device uses an electric motor as the power source. The electric motor engages with the power shaft, and both ends of the power shaft engage with the lifting shaft through bevel gears. The surface of the lifting shaft is provided with a grapple plate for grasping the container. The engagement between the power shaft and the lifting shaft can drive the grapple plate at the bottom of the grapple fixing block to rotate, which facilitates grasping the container. The position sensing detection mechanism can sense whether the grapple plate has reached a normal position and whether the position is correct, and can collect the position information of the grapple plate, which achieves a high degree of intelligence. When encountering interference, the interference guide post is lifted up, which effectively protects the grasping platform. After the grasping action, under the driving of the suspension robot, the grasping platform is driven to move in the direction of the lifting belt, which achieves good practical performance.

Referring to FIGS. 5-1 and 5-2, they show a sensing device of the grasping platform, including the grasping platform. A grasping end surface of the grasping platform is provided with a lifting shaft 4-2, and a sensor bracket 5-14 is installed around the lifting shaft 4-2, two ends of the lifting shaft 4-2 are provided with grapple fixing blocks 4-3, and the bottom of the grapple fixing block 4-3 is provided with a grapple 5-11 for grasping the container 8. The top of the grapple fixing block 4-3 is provided with a grapple sensing sheet 5-3 for sensing the lowering position of the grasping platform. A first grapple sensor 5-1 is installed on the top of the sensor bracket on the side of the grapple fixing block 4-3, and a second grapple sensor 5-2 is installed on the bottom of the sensor bracket on the side of the grapple fixing block 4-3. The first grapple sensor 5-1 and the second grapple sensor 5-2 are used to control opening or closing angle of the grapple 5-11. The sensor end surface of the grasping platform includes an in-place sensor 5-4, a first container positioning sensor 5-5, a second container positioning sensor 5-6, and a third container positioning sensor 5-7. The bottom of the third container positioning sensor 5-7 is provided with a container positioning sensing block 5-8.

In addition, the lifting shaft 4-2 engages with a power mechanism through the bevel gear 4-5, and both ends of the lifting shaft 4-2 are installed with bearing seats. The sensor bracket 5-14 is L-shaped, and an arc-shaped hole for installing the sensor is formed in the middle of the sensor bracket 5-14. Surfaces of the first grapple sensor 5-1, the second grapple sensor 5-2, the in-place sensor 5-4, the first container positioning sensor 5-5, the second container positioning sensor 5-6, the third container positioning sensor 5-7 are provided with proximity switches 4-23. The in-place sensor 5-4 and the first container positioning sensor 5-5 are arranged opposite to each other, the first container positioning sensor 5-5, the second container positioning sensor 5-6, and the third container positioning sensor 5-7 are all distributed on the opposite corners of the grasping platform.

The use of the sensing device of the grasping mechanism is as follows.

The first grapple sensor and the second grapple sensor control the opening and closing angles of the grapple.

The grapple sensing sheet is used to position the grasping platform and provide feedback that the grasping platform is lowered in place, and triggering of the sensor indicates that it falls in place.

The in-place sensor, the first container positioning sensor, and the second container positioning sensor are distributed on the two opposite corners of the container. The first container positioning sensor senses two sides of opposite corners of the container, and the second container positioning sensor and the third container positioning sensor sense two sides of the container. After normally correct positioning, all the first container positioning sensor, the second container positioning sensor, and the third container positioning sensor are not triggered. Once one of the first container positioning sensor, the second container positioning sensor, and the third container positioning sensor is triggered, it can be judged that the grasping platform and the container do not match with each other so that grasping cannot be performed at this time.

A container positioning sensing block cooperates with each of the first container positioning sensor 5-5, the second container positioning sensor, the third container positioning sensor, and the grapple sensing sheet. Under common circumstances, there is a 5 mm gap between each container positioning sensing block and the container. When the grasping platform and the container match with each other by more than 5 mm, the sensing block of one of the first container positioning sensor, the second container positioning sensor, and the third container positioning sensor must be in contact with the container, which triggers the sensor.

The surface of the lifting shaft is provided with the grapple plate for grasping the container. The engagement between the power shaft and the lifting shaft can drive the grapple plate at the bottom of the grapple fixing block to rotate, which facilitates grasping the container. The position sensing detection mechanism can sense whether the grapple plate has reached the normal position. After the grasping is completed, the grasping platform is driven by the suspension robot to move in the direction of the lifting belt.

Through the above embodiments, the present disclosure provides a container storage system, which comprises a rack, a plurality of containers, a carrier vehicle, and a track-switching device. The rack includes a track structure and defines at least one load-bearing platform. The track structure includes a plurality of running tracks, and the at least one load-bearing platform is located below the running track. Each container is configured for storing goods, and at least part of the containers are stacked on the at least one load-bearing platform. The carrier vehicle runs back and forth on the running tracks to perform storage and retrieval operations on the containers in the container storage system. The track-switching device is configured to switch the carrier vehicle from a current running track where the carrier vehicle is located to a target running track.

The track-switching device includes a transition track and a track-switching vehicle. The transition track is connected to the end of each running track. The track-switching vehicle is located on the transition track and can move back and forth on the transition track, and the track-switching vehicle is configured to receive the carrier vehicle and transport the carrier vehicle to the target running track along the transition track. In some embodiments, each of the current running track and the target running track is formed by two running rails arranged side by side on the same layer, and the transition track is perpendicular to each running track. It should be understood that, in some other embodiments, by appropriately modifying the rack structure, the current running track may not be located on the same layer as the target running track. The rack includes a plurality of track layers, each track layer is provided with a load-bearing platform under it, each track layer is provided with several pairs of side-by-side running rails, and the container storage system is provided with the carrier vehicle and the track-switching device corresponding to each track layer.

Figures 1, 2, 3, 4, 5, 6, 7:
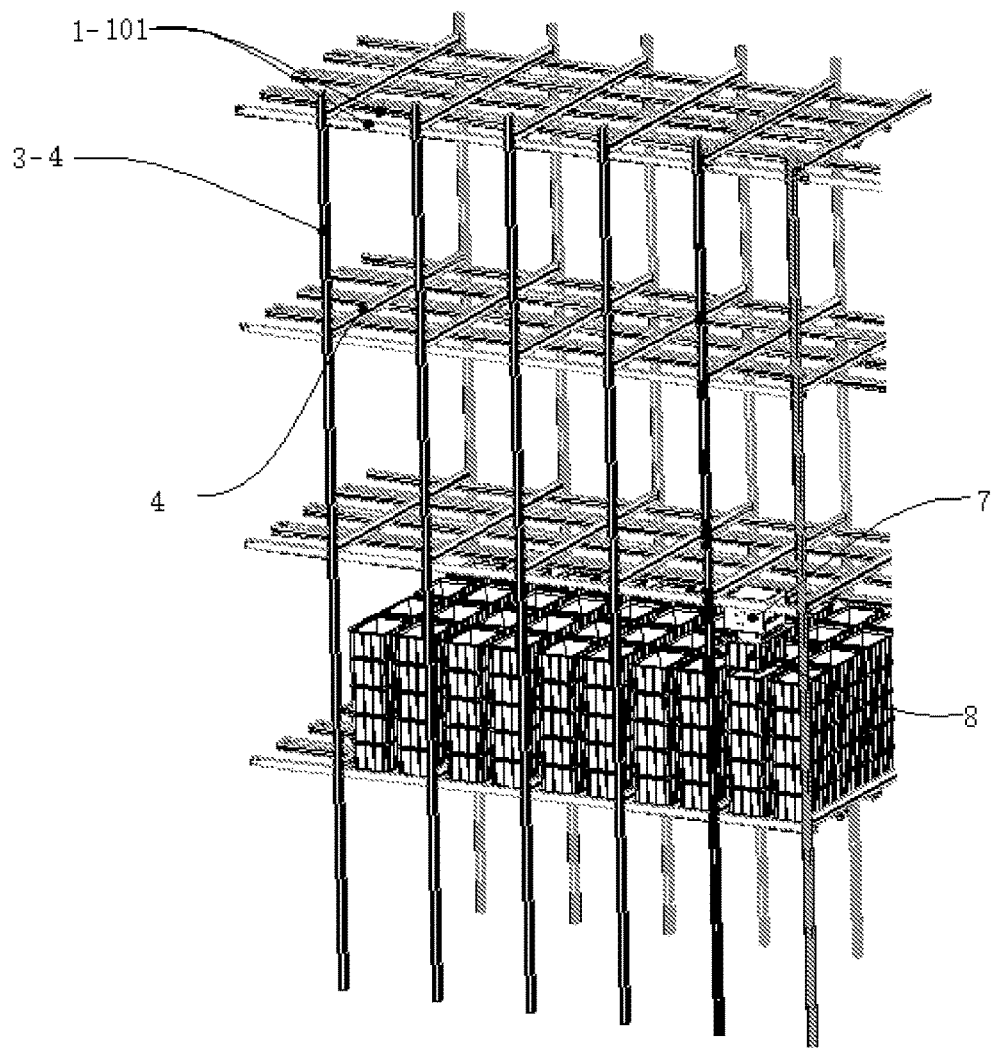

As shown in FIG. 7, in order to control the operation of the container storage system, it has at least one processor 700, and the at least one processor 700 is configured to:

control the plurality of carrier vehicles and/or track-switching vehicles to run on the rack, control at least one of the plurality of carrier vehicles to store a container containing ordered goods into the container storage system, control at least one of the plurality of carrier vehicles to retrieve at least one container containing ordered goods from the container storage system to deliver the at least one retrieved container to a temporary workstation, and control at least one of the plurality of carrier vehicles to store at least one container containing at least one picked goods in the container storage system, the at least one picked goods coming from the at least one retrieved container.

The at least one processor 700 is also configured to control at least one of the plurality of track-switching vehicles to transport a corresponding carrier vehicle to the target running track.

By using the device and system disclosed in the above embodiments, the present disclosure also provides a method for storing and retrieving a target container in/from a container storage system. The container storage system includes a plurality of running tracks, a plurality of containers stacked on at least one load-bearing platform of the container storage system, and a plurality of controllable carrier vehicles and a plurality of track-switching vehicles. The container is used to store goods. These running tracks can be supported on the columns. In the description of the method below, a group of containers stacked together at one storage location is called a stacking tower. This method can be described in combination with an inbound order, an outbound order, and a transfer order.

Figures 1, 2:
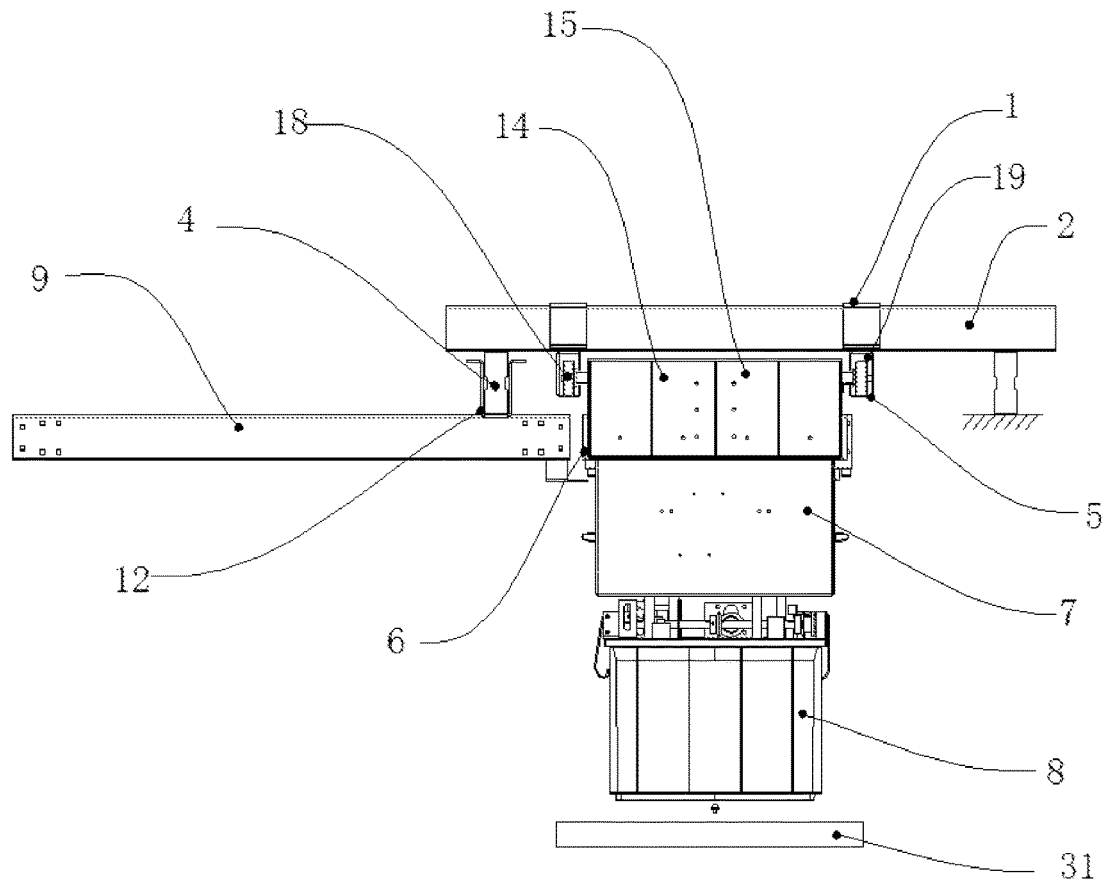
Figure 2:
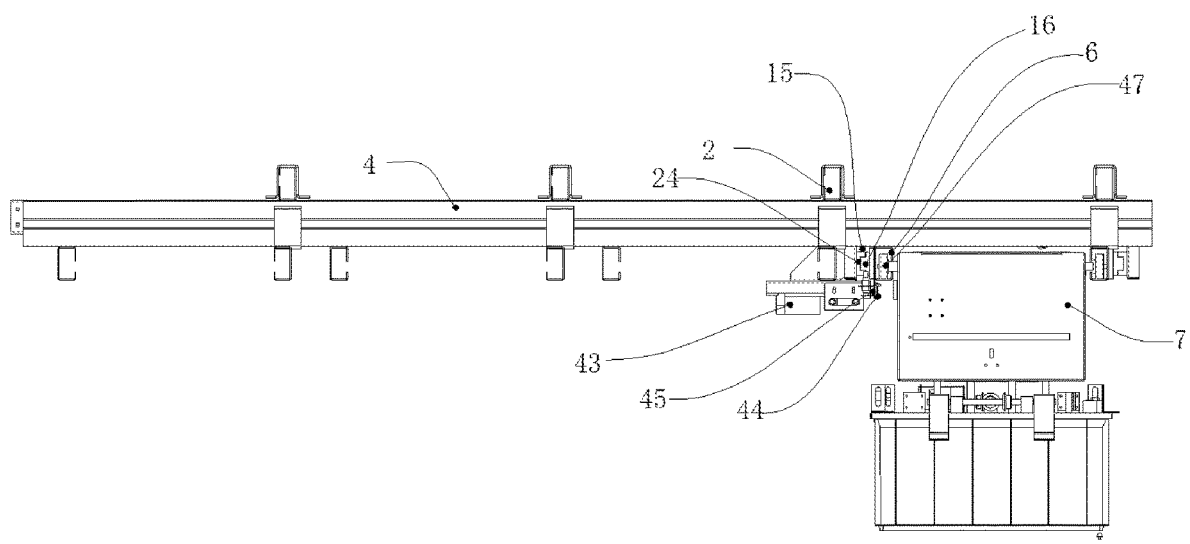
Figures 2, 3:
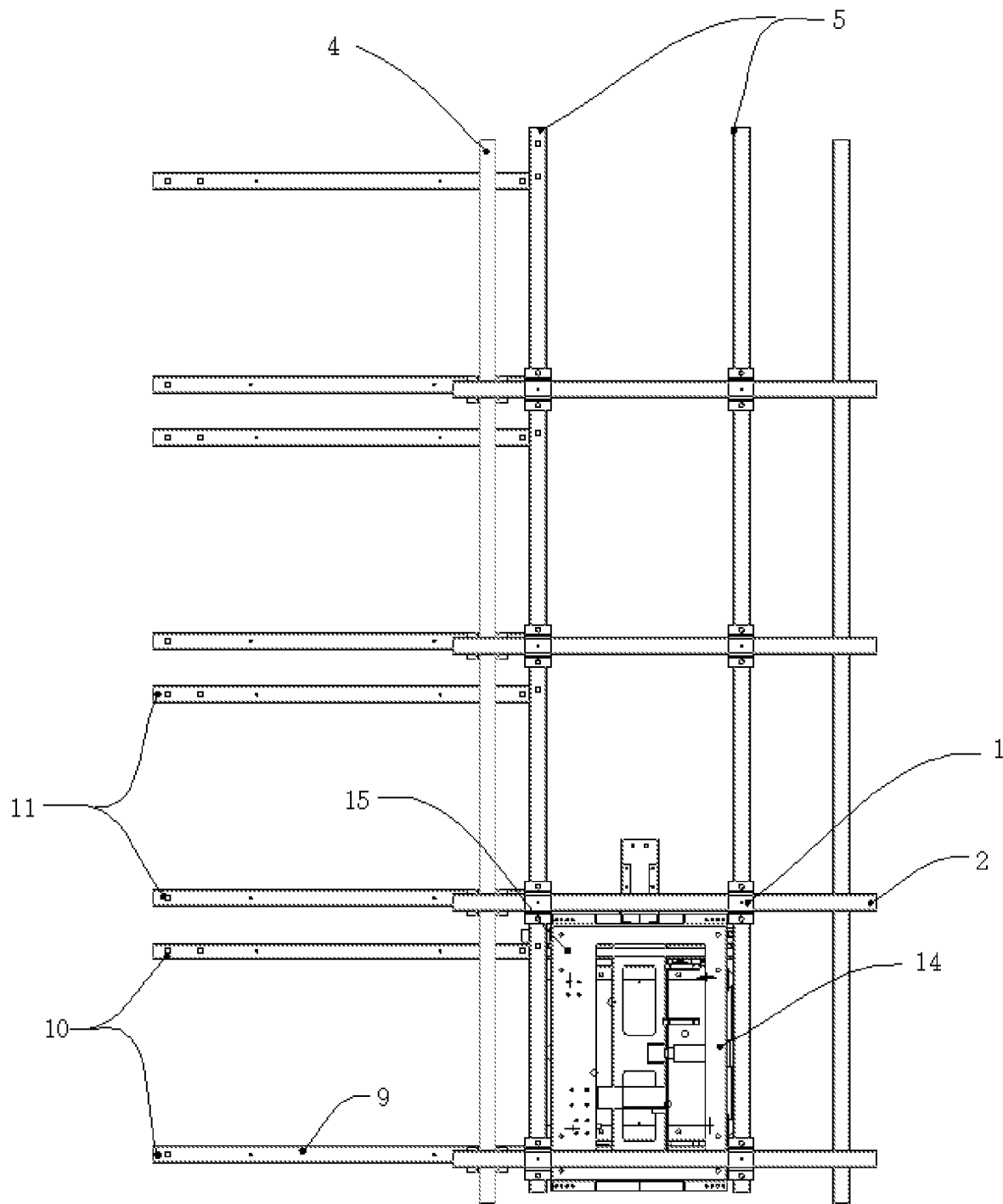
Figures 2, 3, 4:
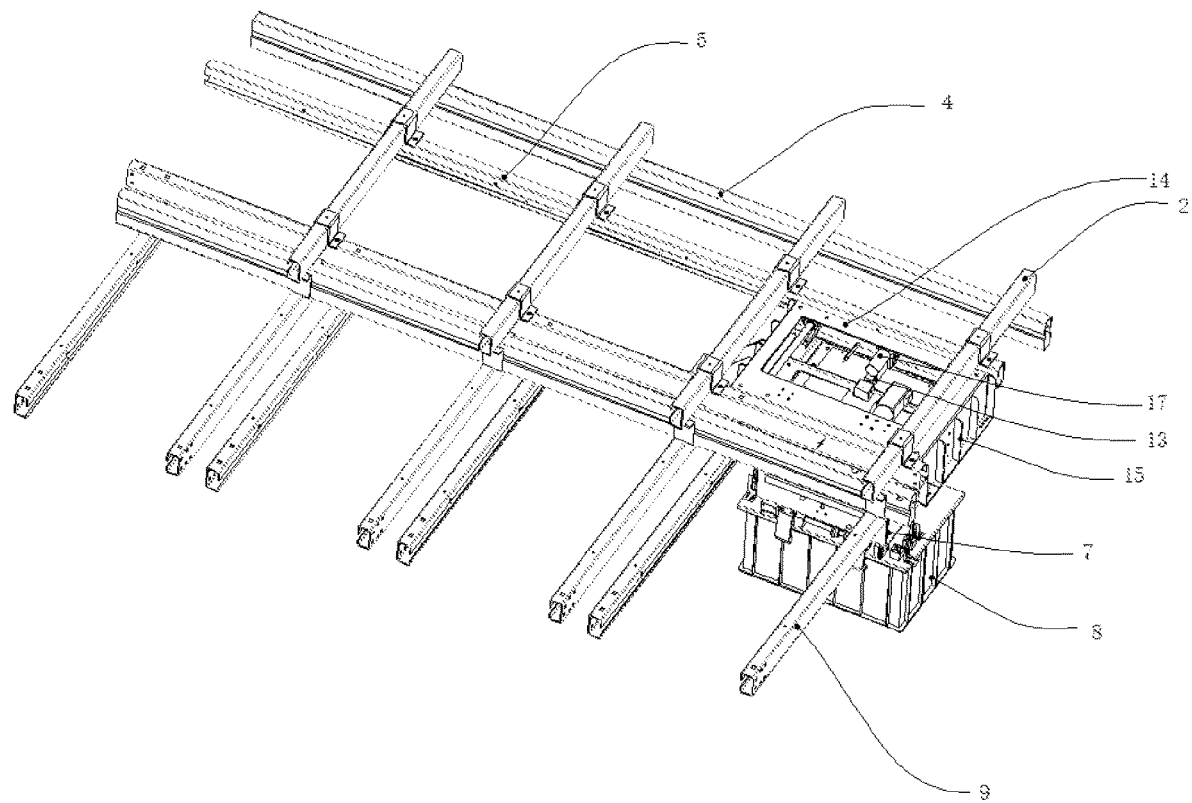
Figures 2, 3, 4, 5:
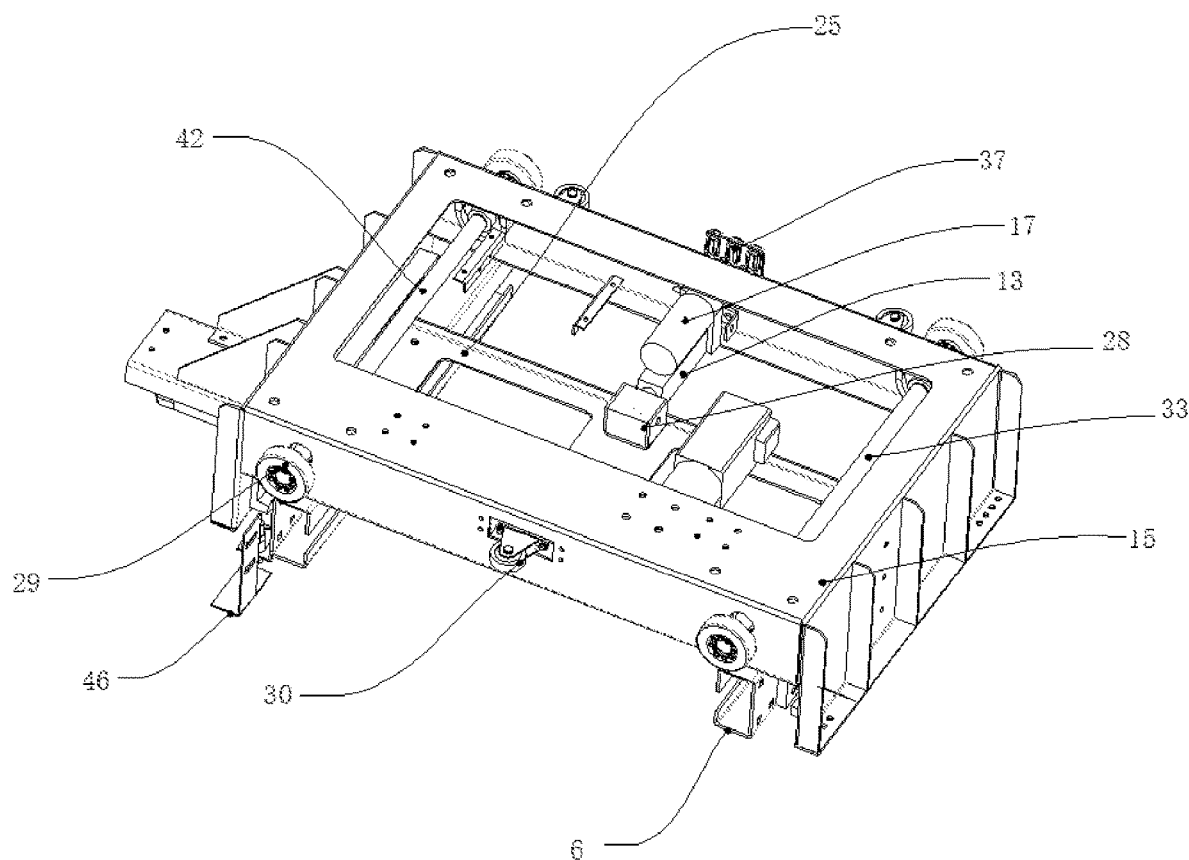
Figures 2, 3, 4, 5, 6:
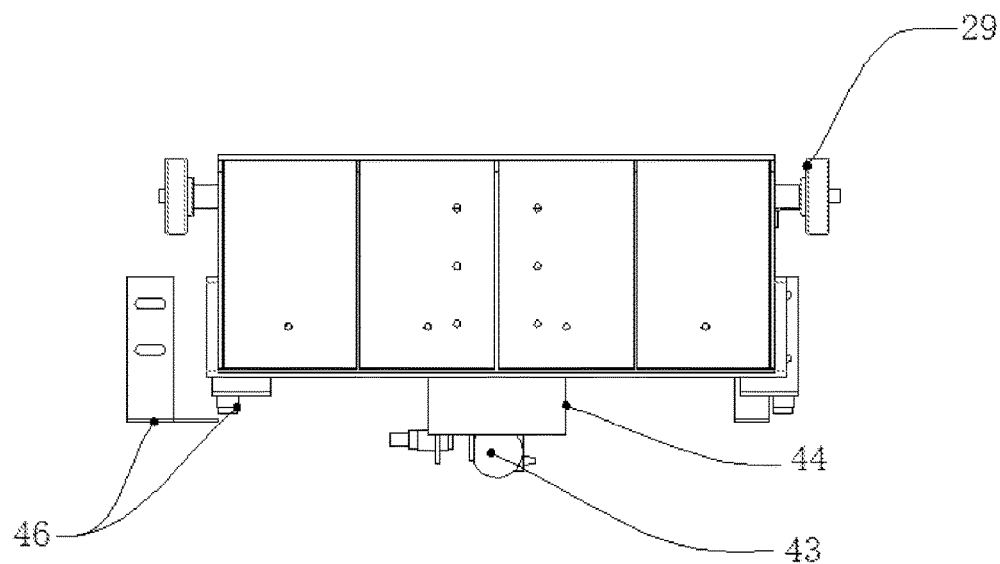
Figures 2, 3, 4, 5, 6, 7:
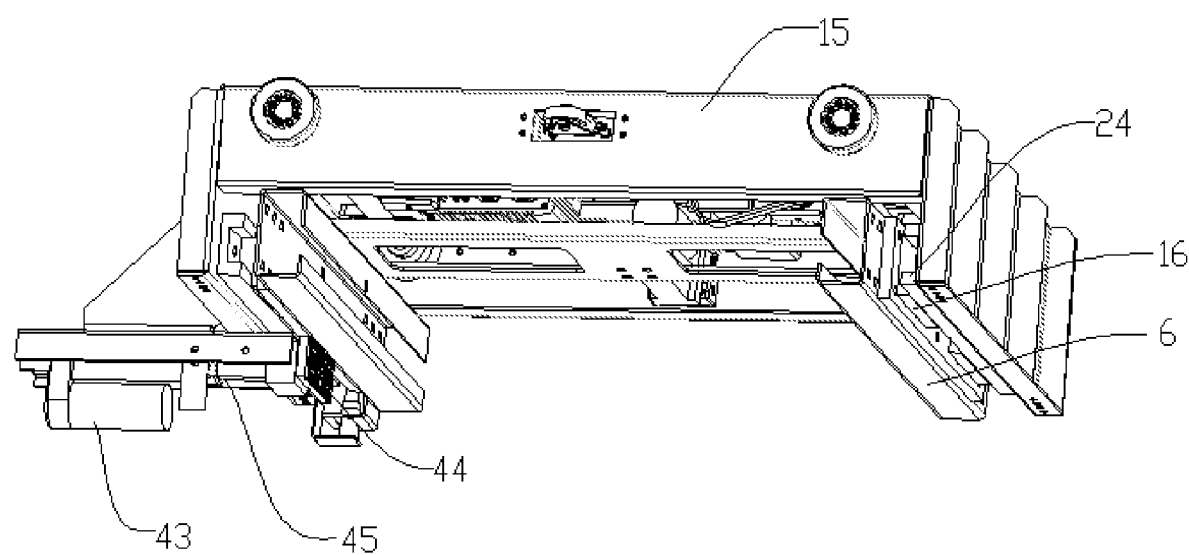
Figures 2, 3, 4, 5, 6, 7, 8:
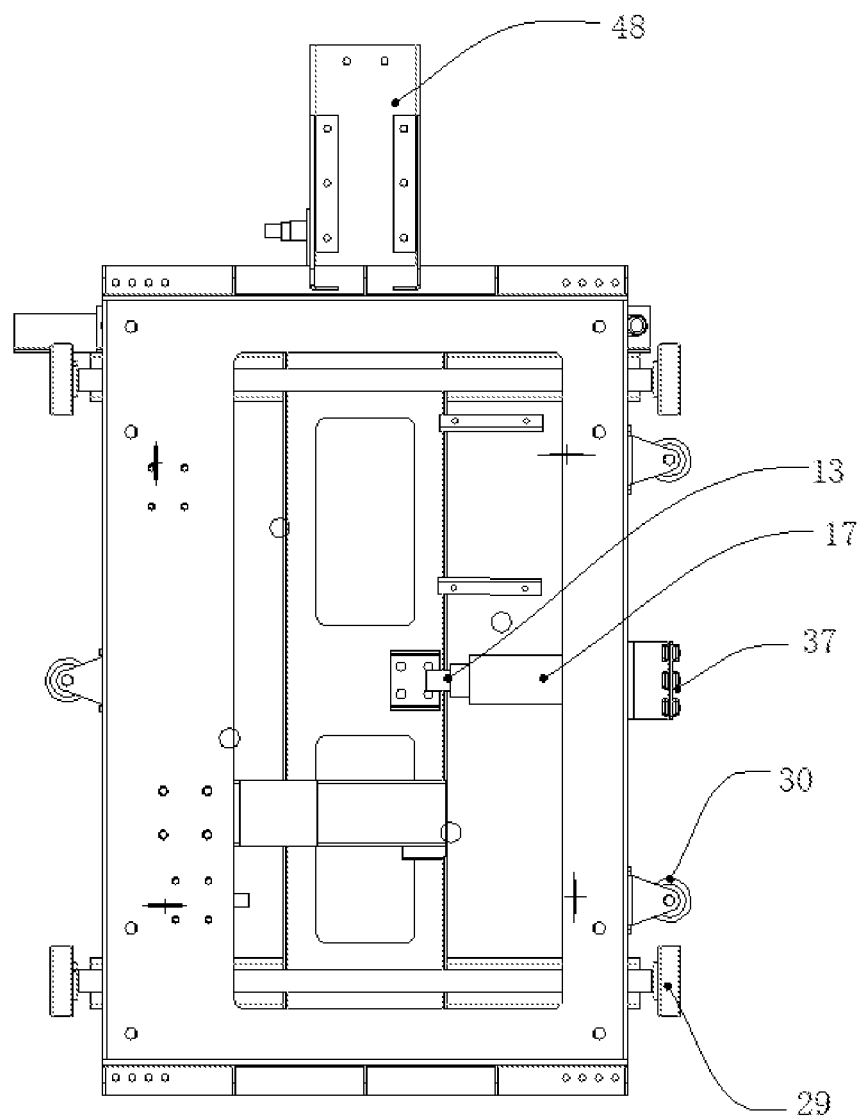

As shown in FIG. 8, when processing the inbound order, the method includes as follows:

S810: determining a target storage location of a target container according to the order information, controlling at least one carrier vehicle to run along a target running track to above the target container, and loading the target container on the carrier vehicle by means of a grasping mechanism, and then controlling the carrier vehicle loaded with the target container to run along the target running track to above the target storage location and placing the target container in the target storage location.

S820: if the target container is not in a working space of the current running track of the carrier vehicle, controlling one of the track-switching vehicles to transport the carrier vehicle to the target running rail above the target container, and then controlling the carrier vehicle to run along the target running rail to be above the target container and loading the target container on the carrier vehicle by means of the grasping mechanism, and then controlling the carrier vehicle loaded with the target container to run along the target running track to above the target storage location and placing the target container in the target storage location.

S830: if the target storage location is not in the working space of the current running track of the carrier vehicle loaded with the target container, controlling one of the track-switching vehicles to transport the carrier vehicle loaded with the target container to a target running track corresponding to the target storage location, and then controlling the carrier vehicle loaded with the target container to run along the target running track to above the target storage location and placing the target container in the target storage location.

In the method of FIG. 8, the target container is generally placed on an topmost layer of the target storage location, but in some embodiments, the target container may alternatively be placed on another specific layer of the target storage location.

Figures 2, 3, 4, 5, 6, 7, 8, 9:
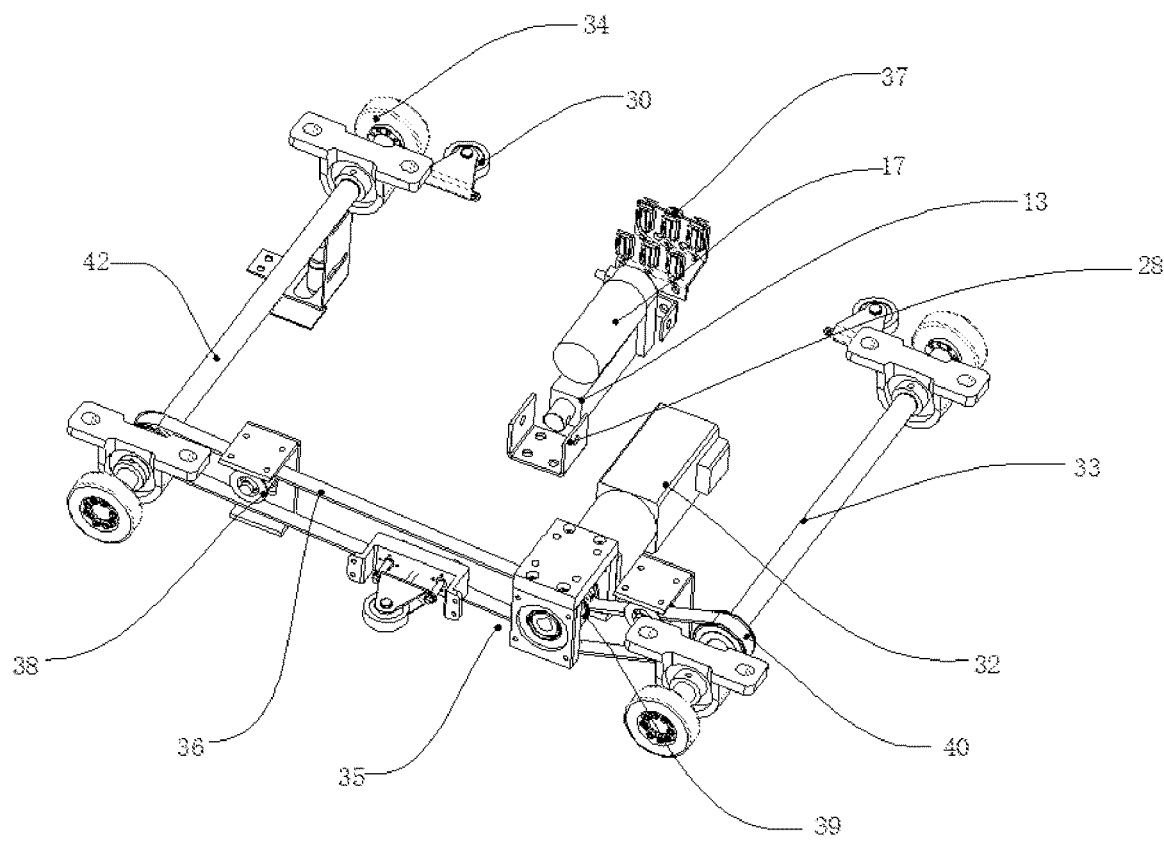

As shown in FIG. 9, when processing the outbound order, the method includes as follows:

S910: determining a location of a target container according to the order information, controlling at least one carrier vehicle to move to above the target container along one of the running tracks, and picking up the target container by means of the grasping mechanism of the carrier vehicle.

S920: if the target container is not at the topmost of the stacking tower where the container is located, controlling one or more carrier vehicles to transfer and place non-target containers stacked above the target container on other stacking tower by means of the grasping mechanism of the carrier vehicle so that the target container is located at the topmost of the stacking tower, and controlling one carrier vehicle to pick up the target container by means of the grasping mechanism of the carrier vehicle.

In S920, during transferring and placing the non-target containers stacked above the target container on other stacking tower, the non-target containers can be transferred one by one or in batch.

S930: if the target container is not in the working space of the current running track of the carrier vehicle, controlling one of the track-switching vehicles to transport the carrier vehicle to the target running track above the target container, and then controlling the carrier vehicle to run along the target running track to above the target container and pick up the target container by means of the grasping mechanism.

Figures 2, 3, 4, 5, 6, 7, 8, 9, 10:
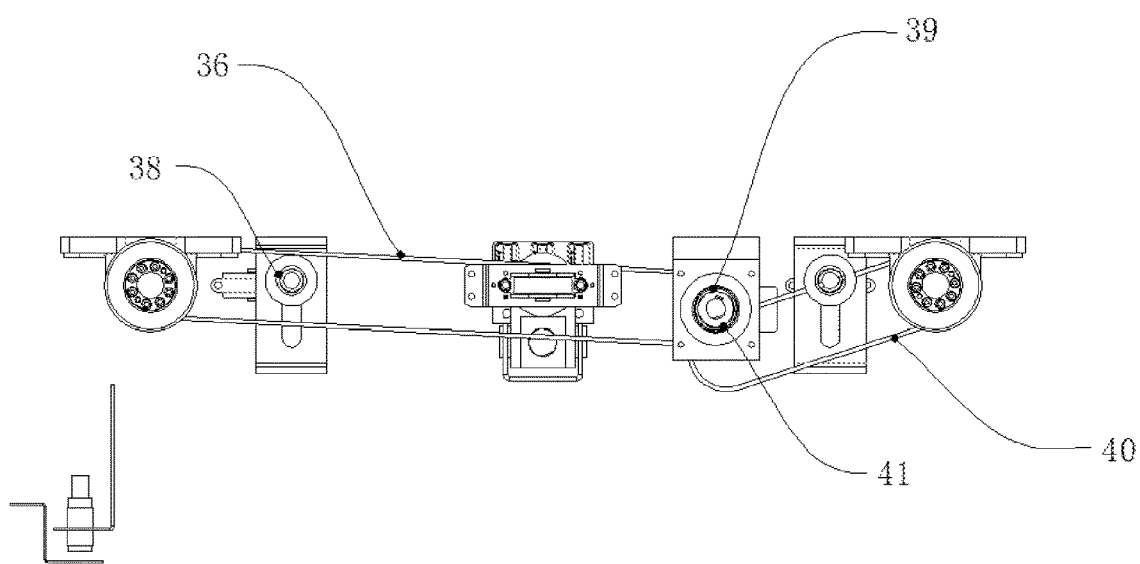
Figures 2, 3, 4, 5, 6, 7, 8, 9, 10, 11:
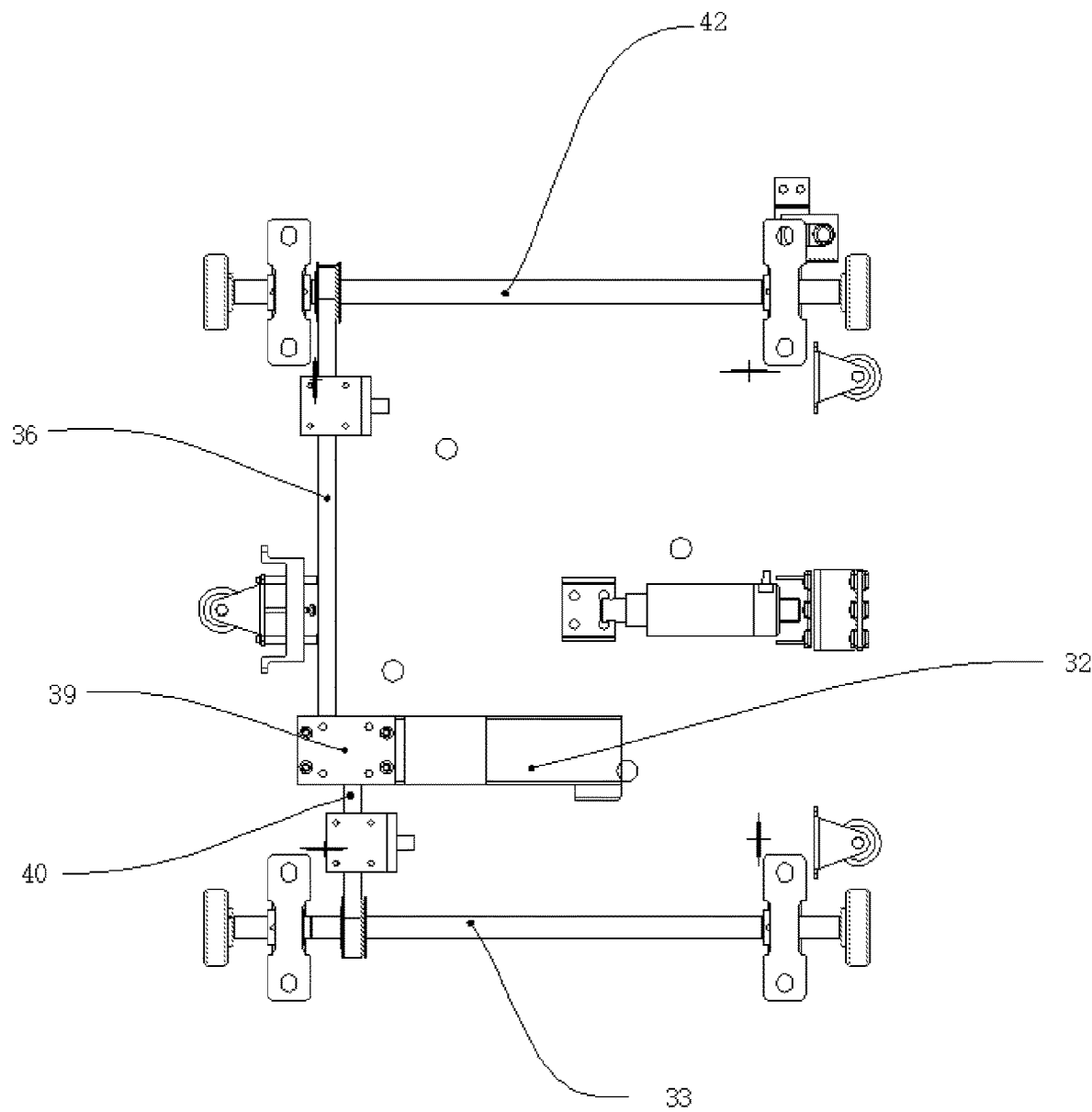
Figures 2, 3, 4, 5, 6, 7, 8, 9, 10, 11, 12:
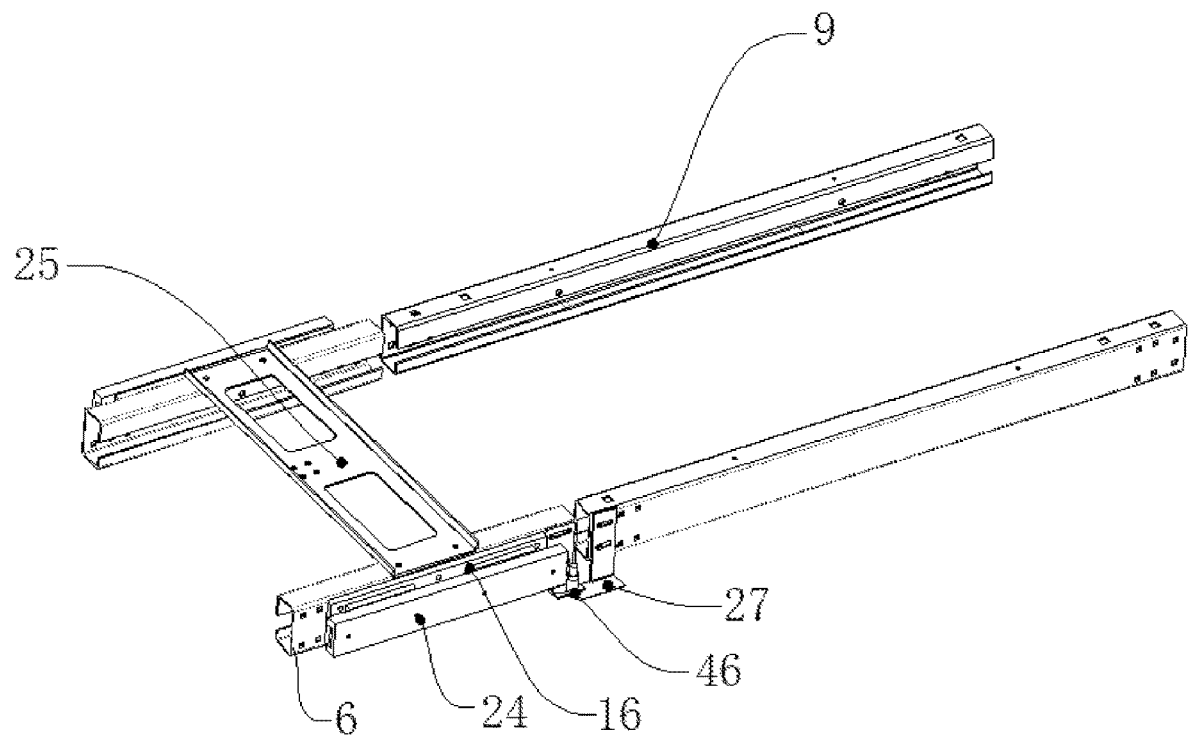
Figures 2, 3, 4, 5, 6, 7, 8, 9, 10, 11, 12, 13:
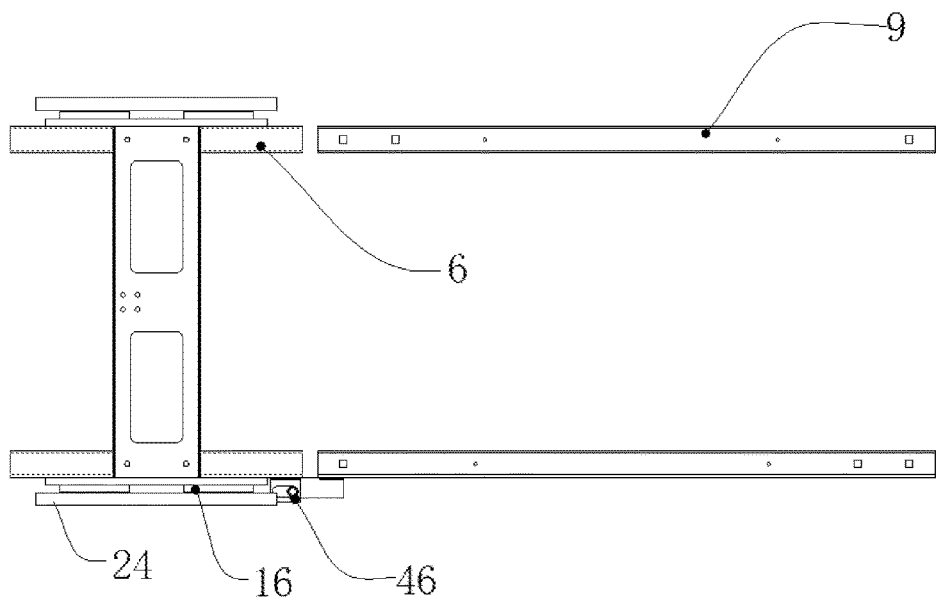
Figures 2, 3, 4, 5, 6, 7, 8, 9, 10, 11, 12, 13, 14:
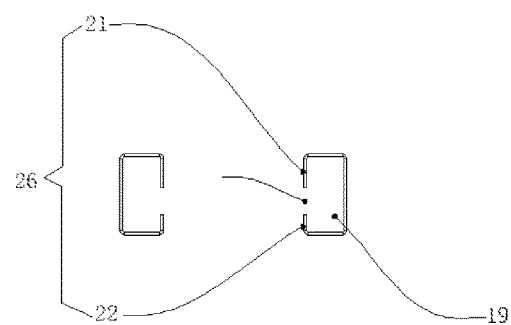
Figures 2, 3, 4, 5, 6, 7, 8, 9, 10, 11, 12, 13, 14, 15:
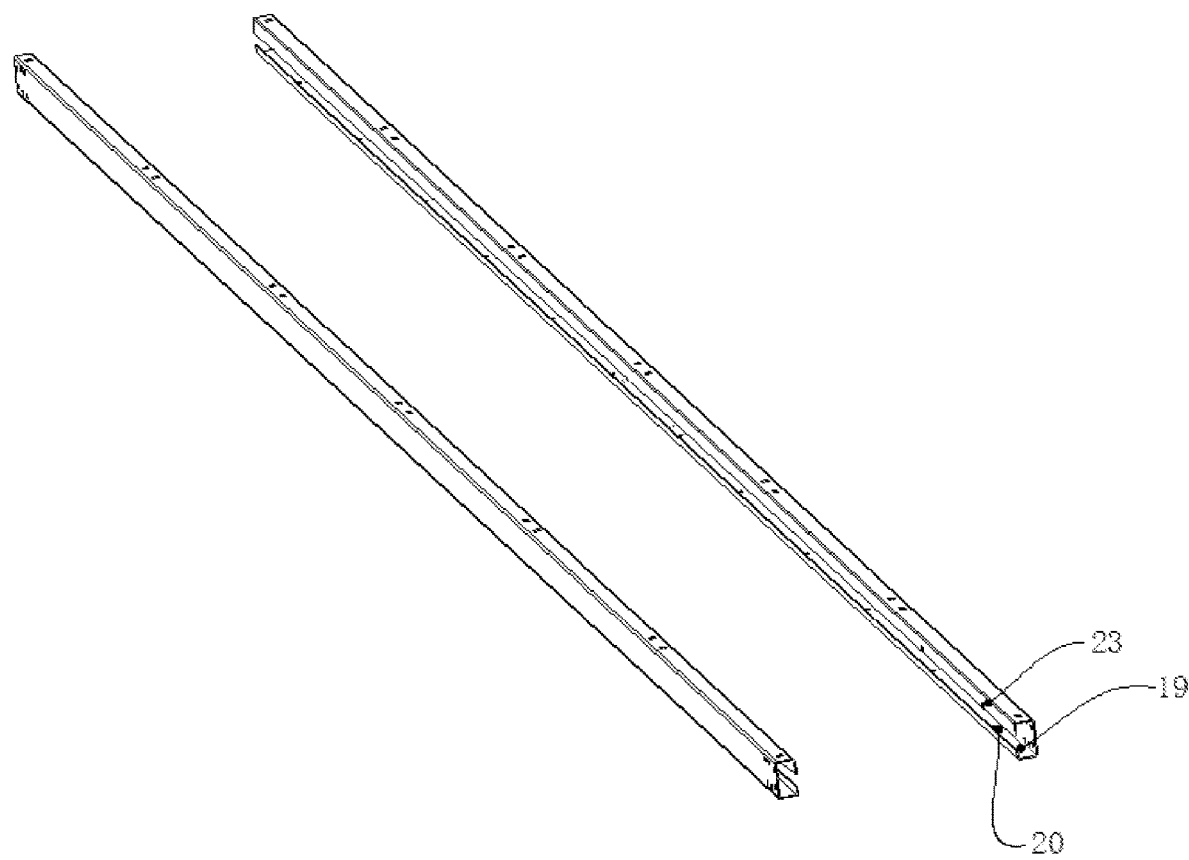
Figures 2, 3, 4, 5, 6, 7, 8, 9, 10, 11, 12, 13, 14, 15, 16:
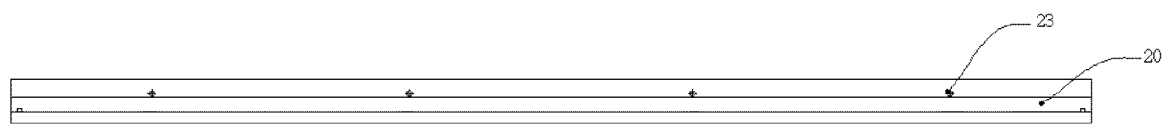
Figures 2, 3, 4, 5, 6, 7, 8, 9, 10, 11, 12, 13, 14, 15, 16, 17:
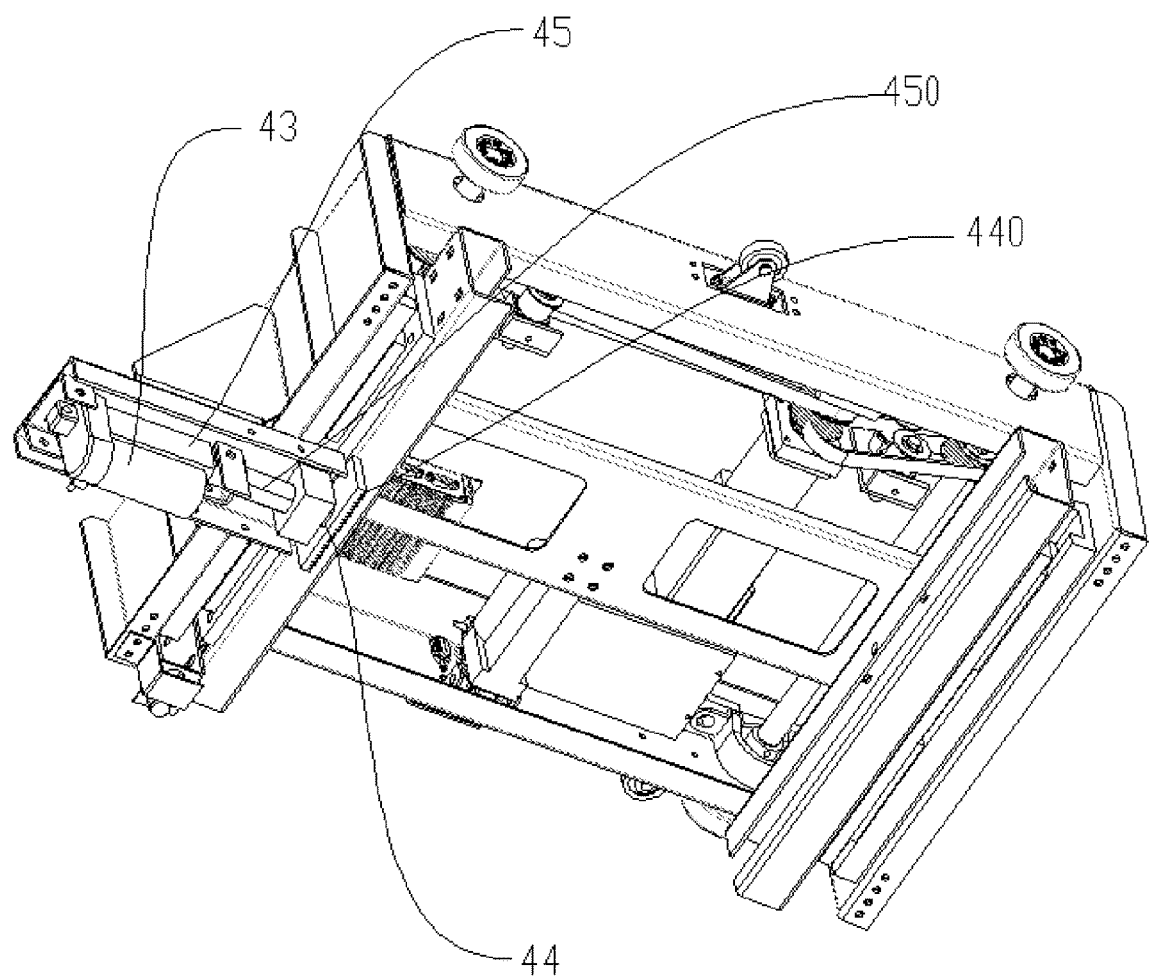
Figures 1, 3:
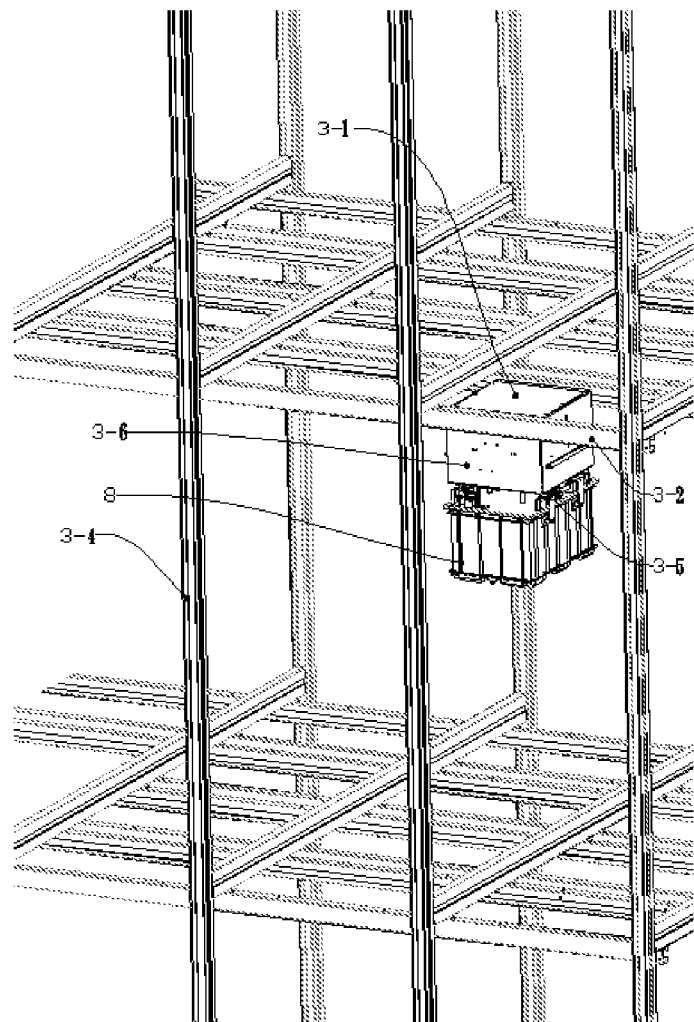
Figures 2, 3:
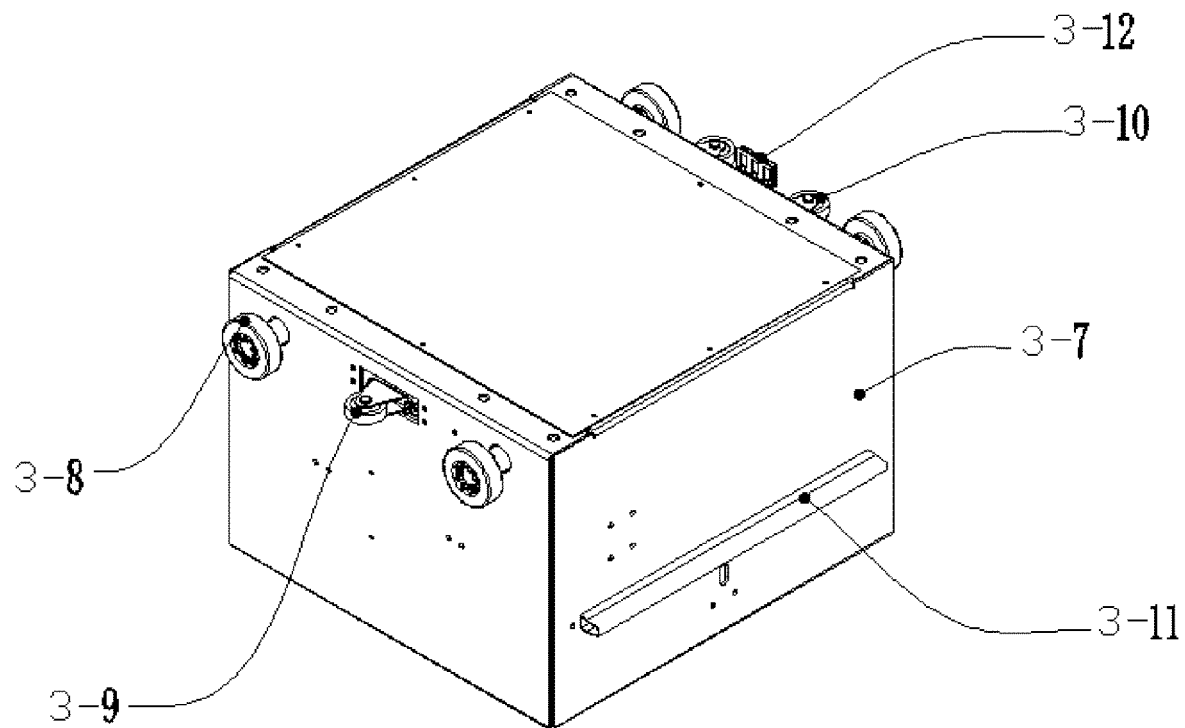
Figure 3:
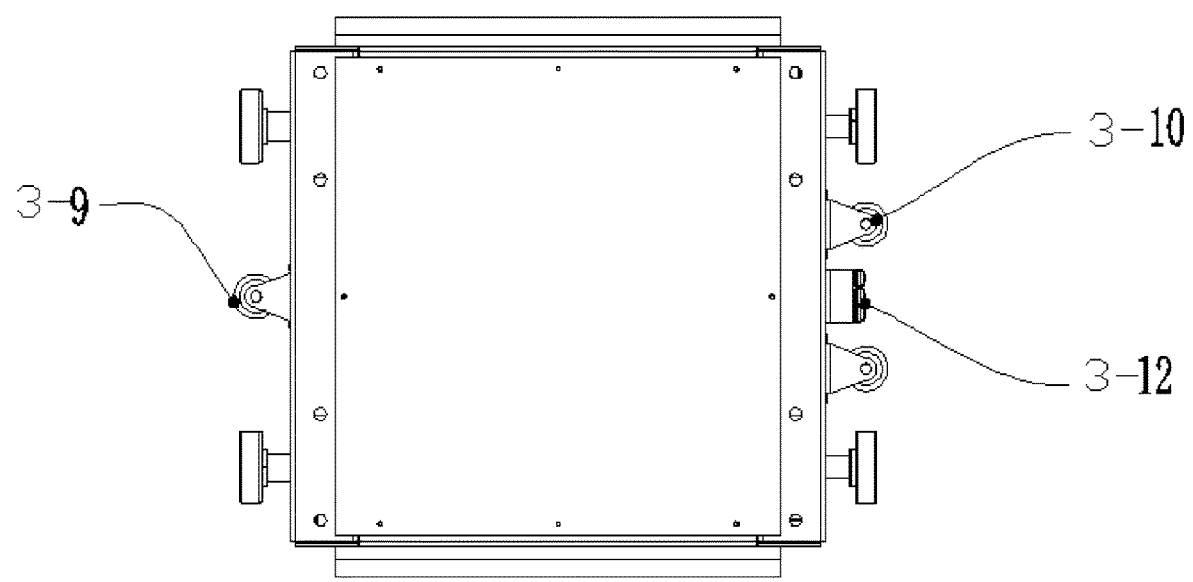
Figures 3, 4:
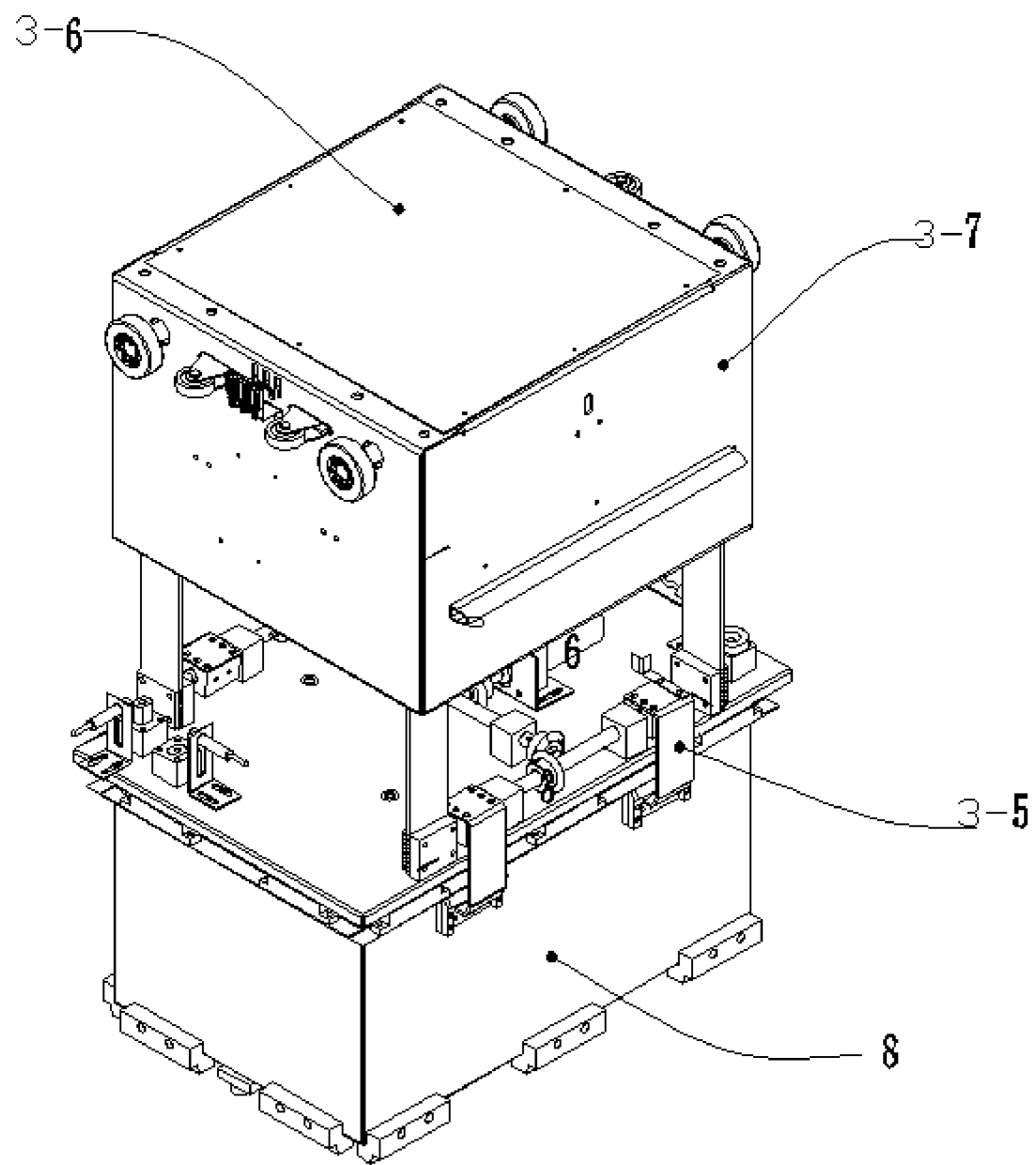
Figures 3, 4, 5:
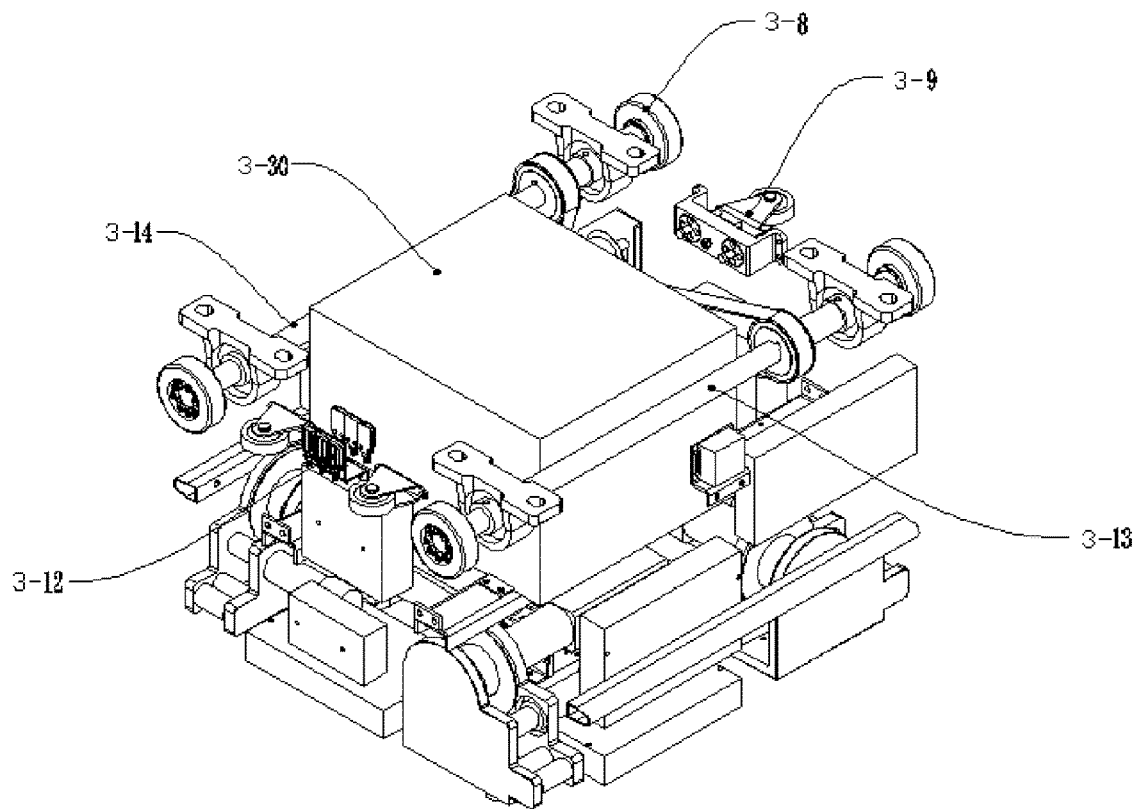
Figures 3, 4, 5, 6:
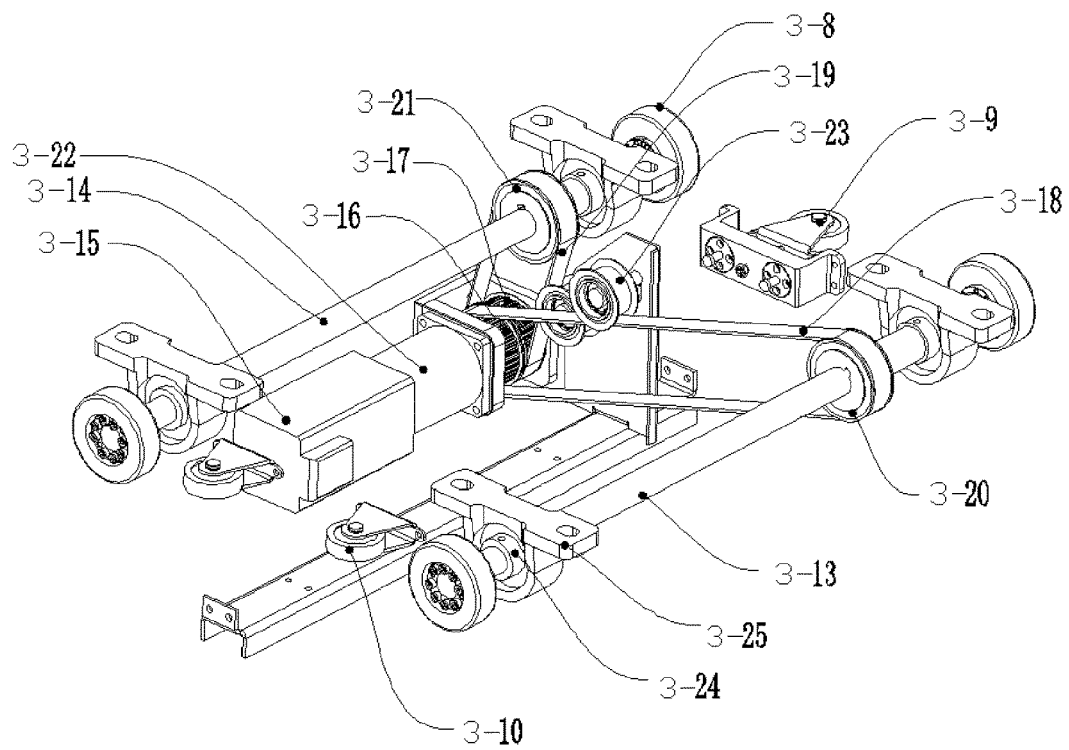
Figures 3, 4, 5, 6, 7:
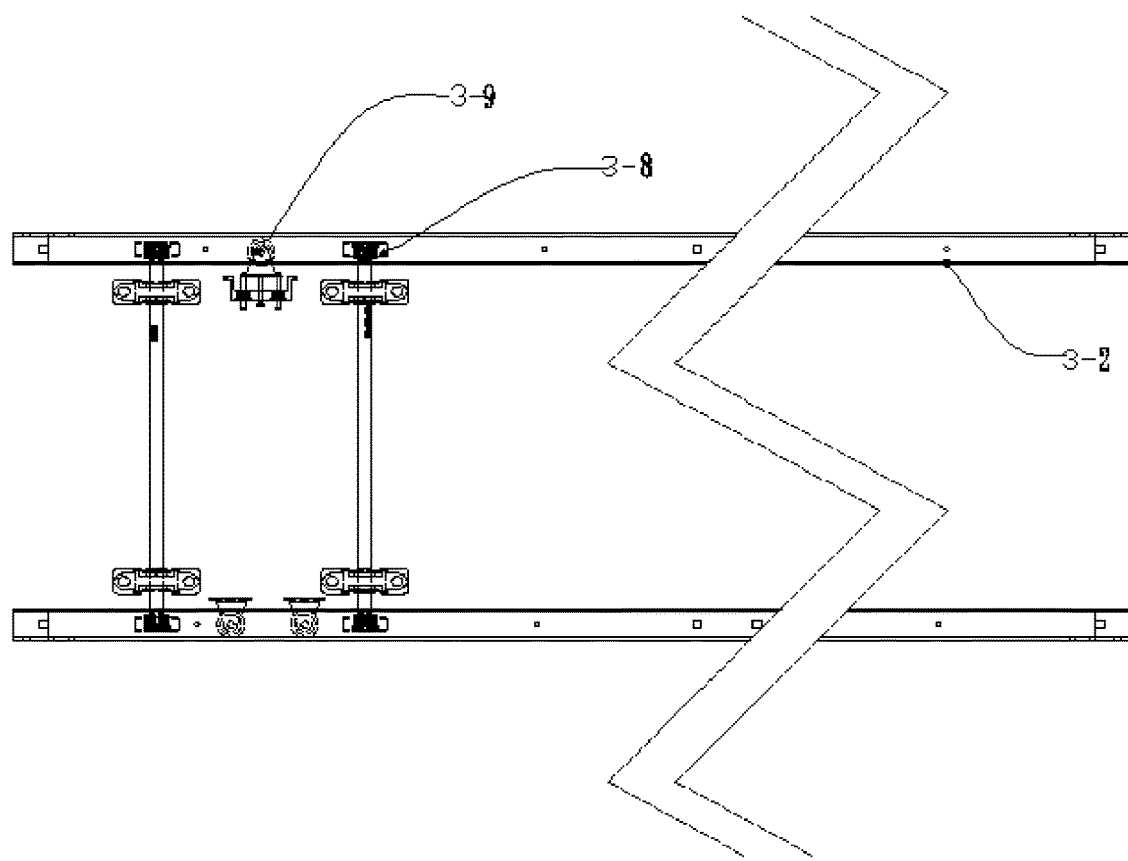
Figures 3, 4, 5, 6, 7, 8:
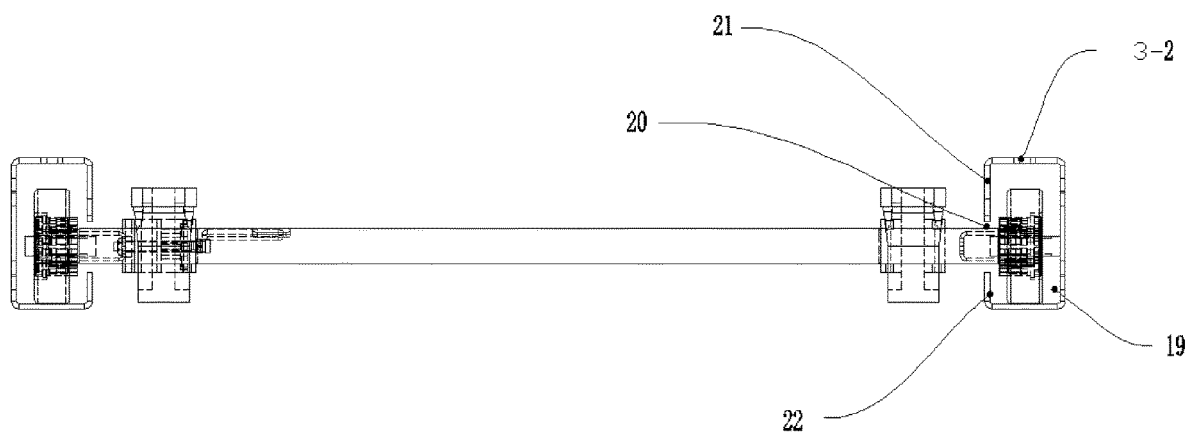
Figures 3, 4, 5, 6, 7, 8, 9:
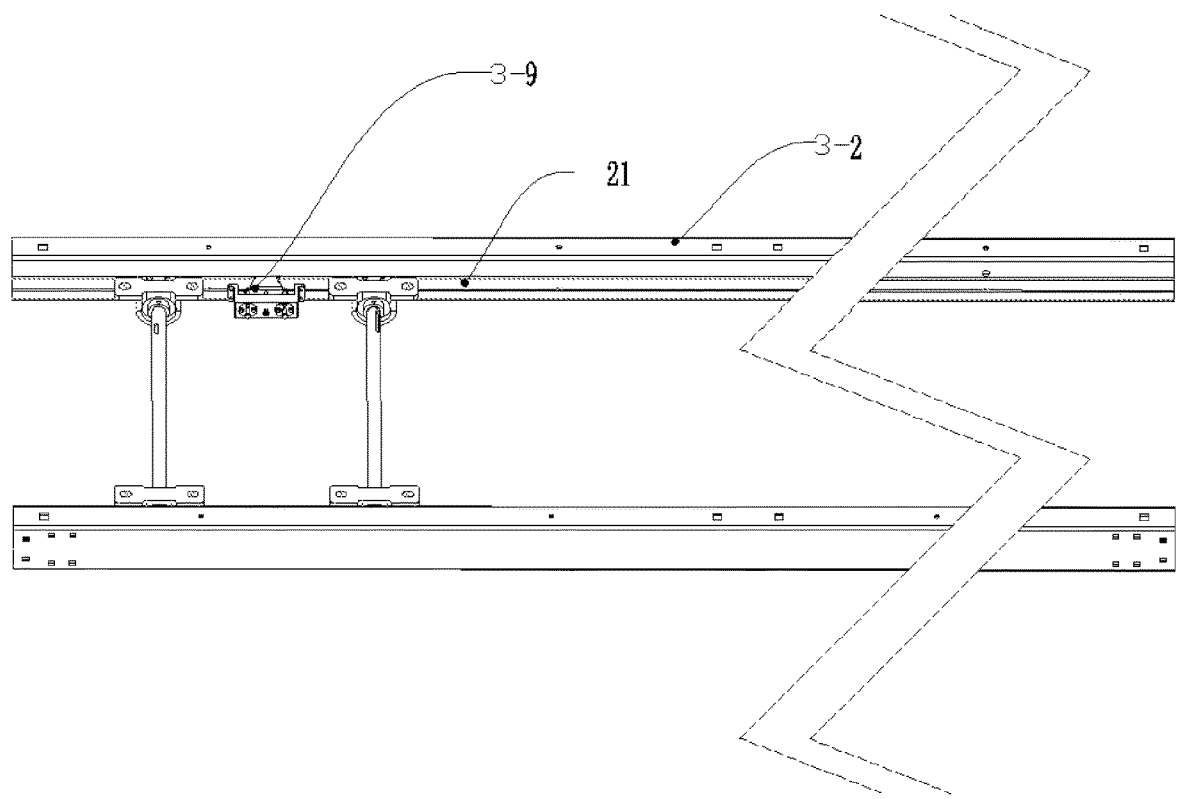
Figures 3, 4, 5, 6, 7, 8, 9, 10:
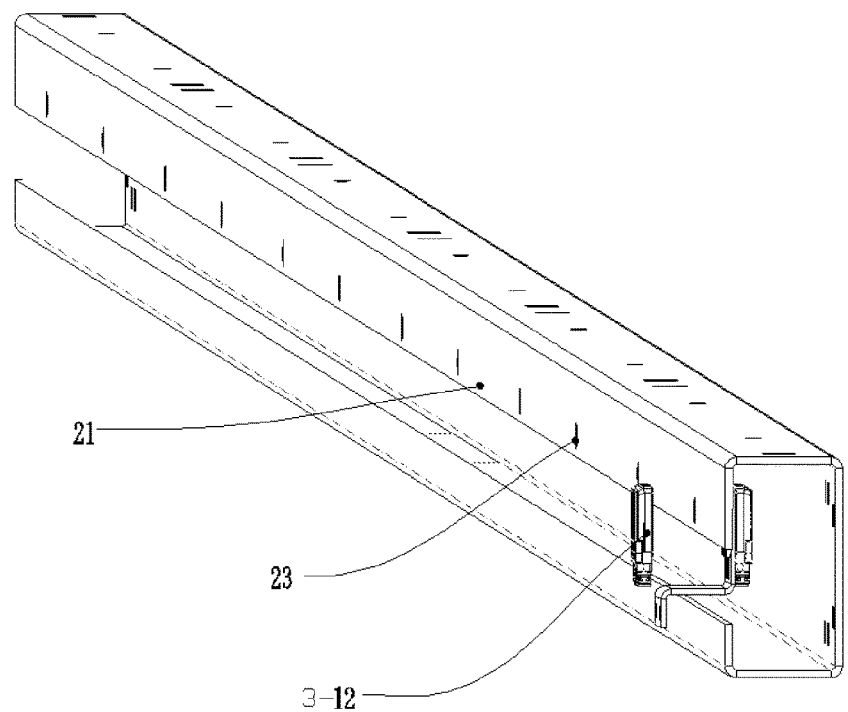
Figure 4:
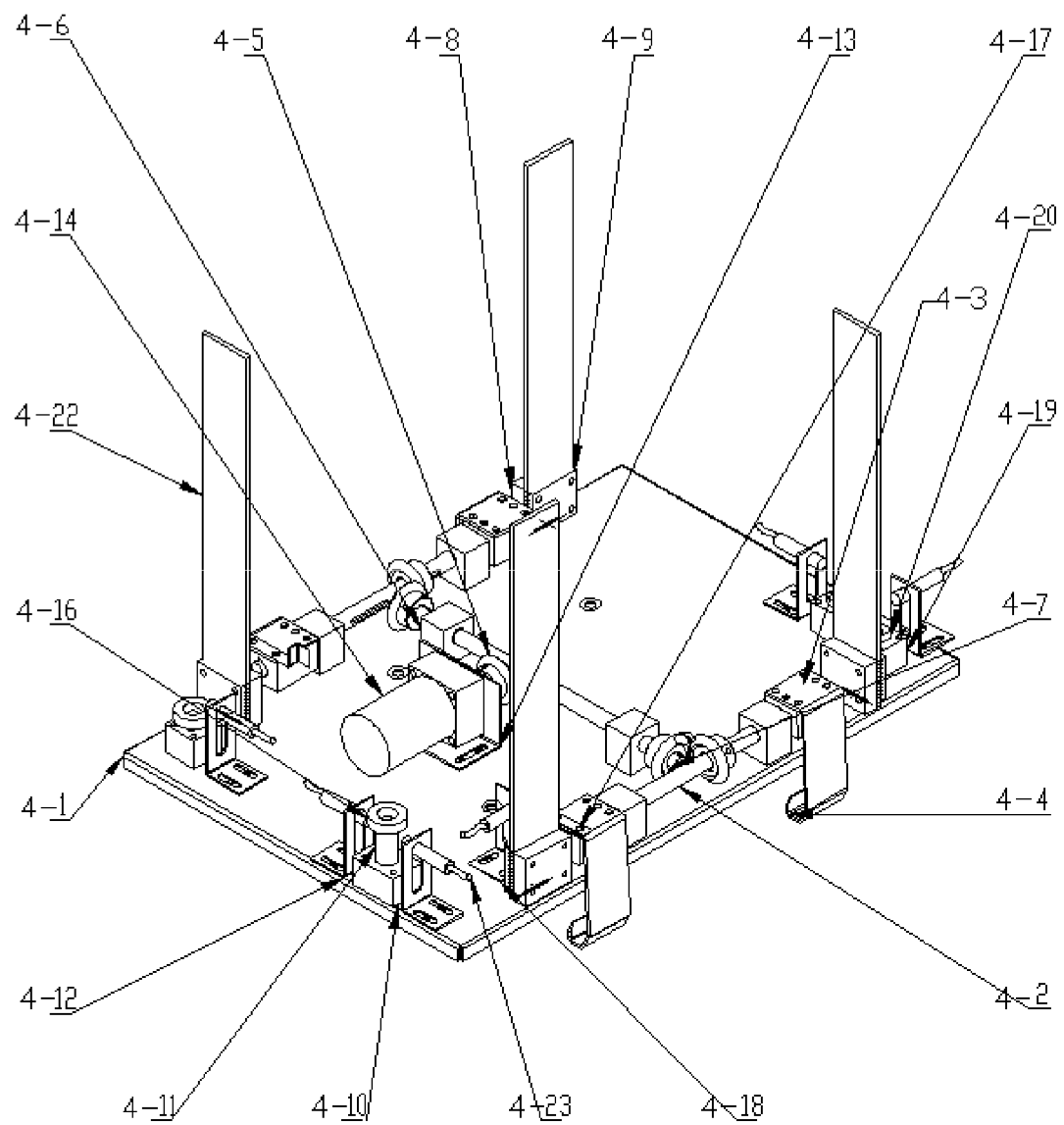
Figures 1, 5:
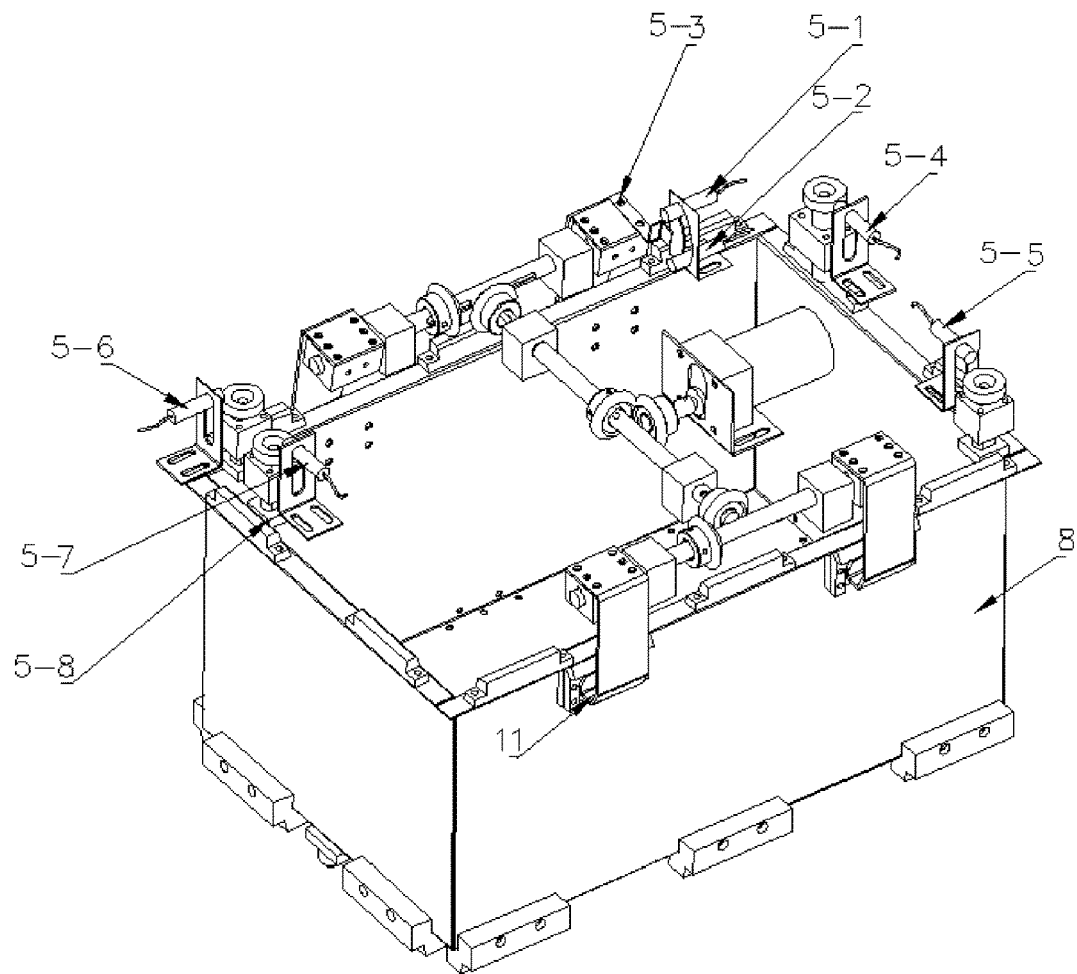
Figures 2, 5:
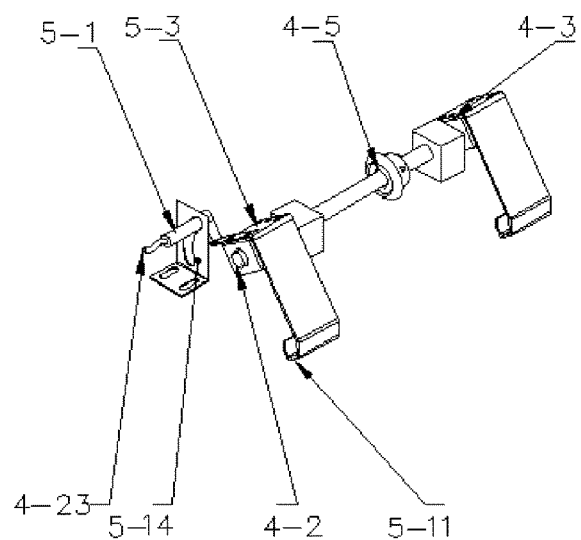
Figure 6:
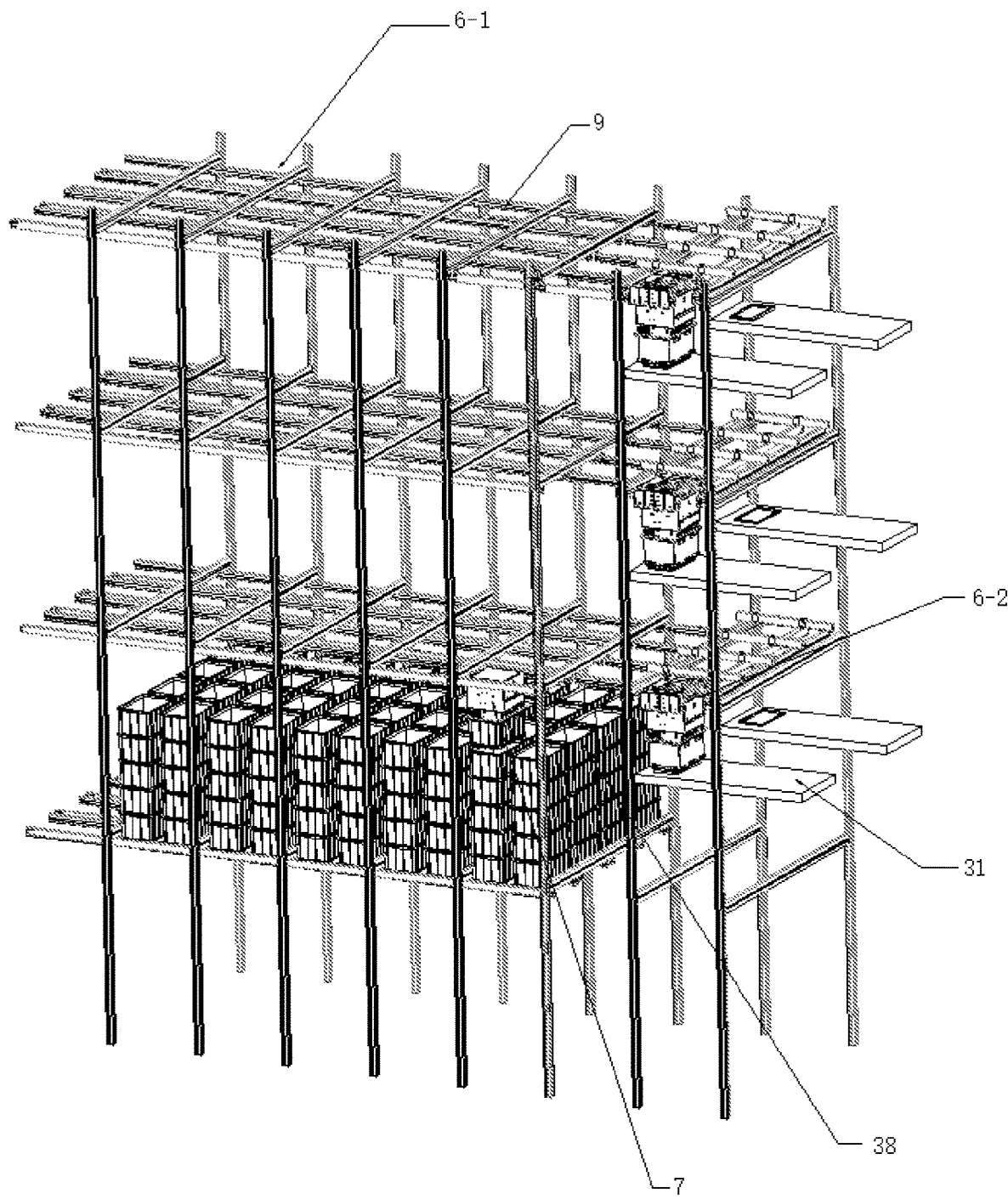
Figure 7:
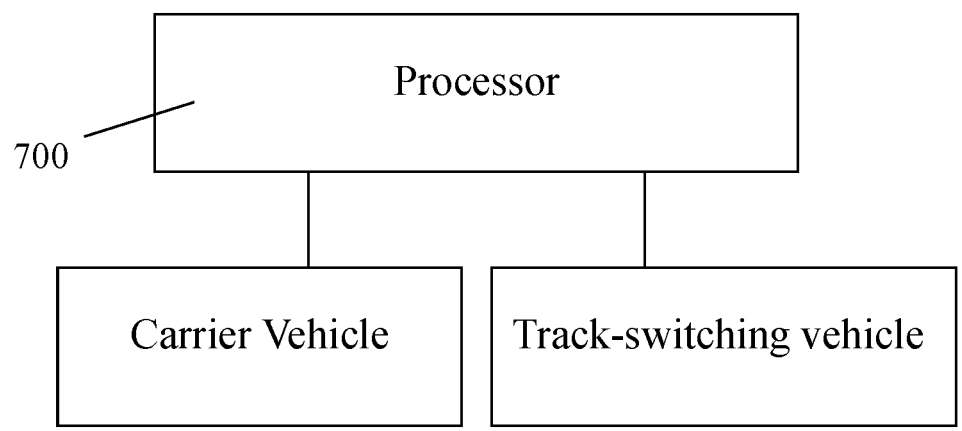
Figure 8:
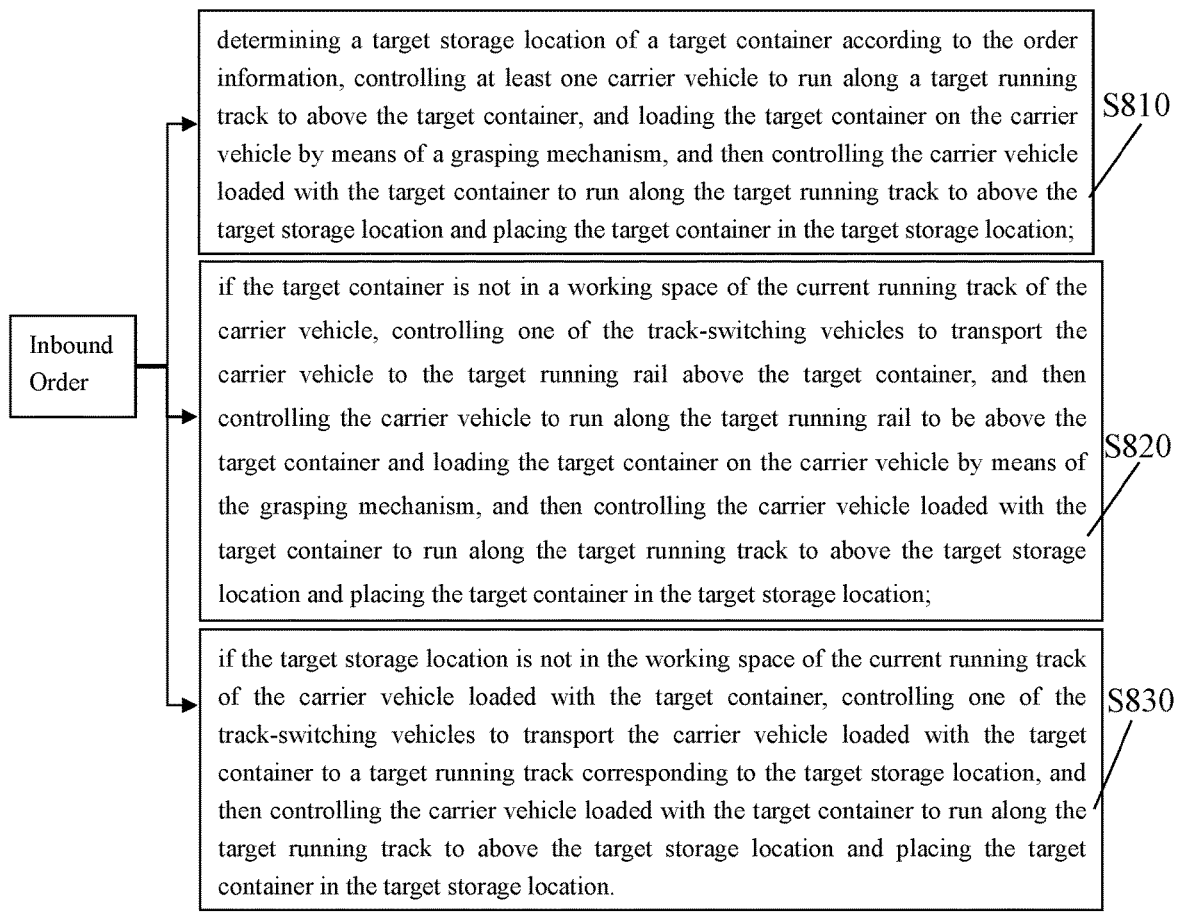
Figure 9:
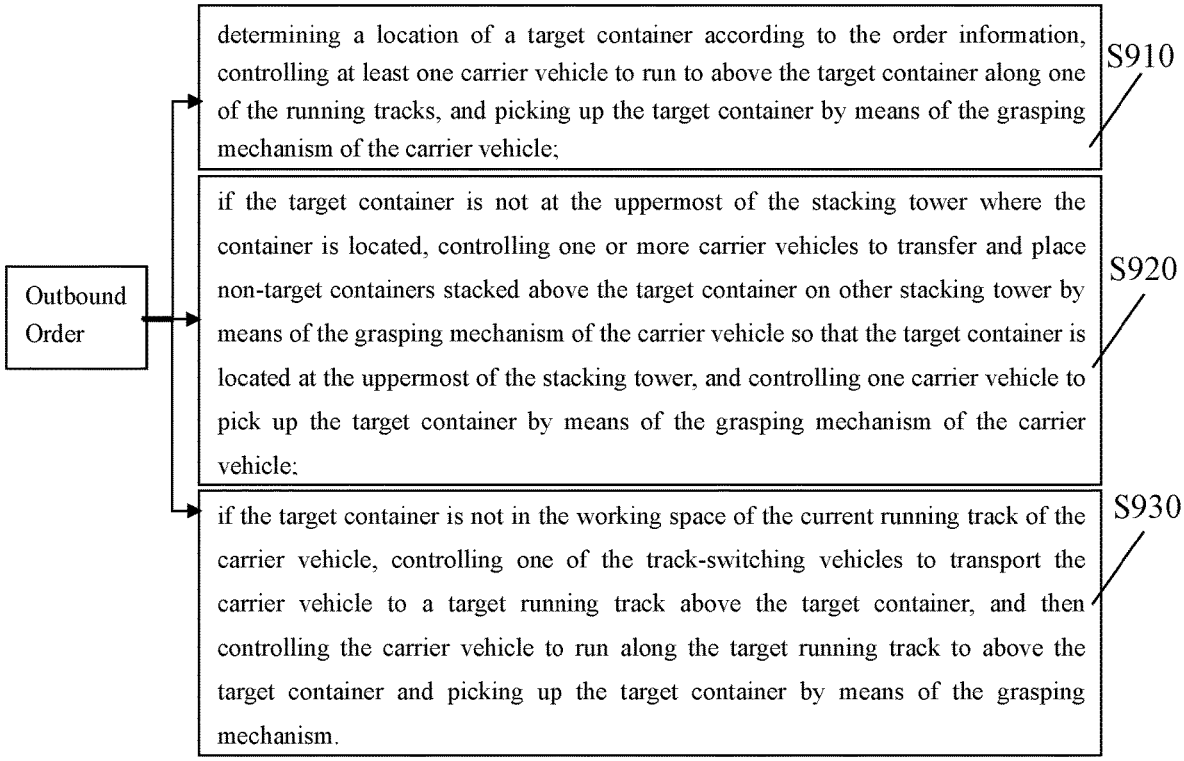
Figure 10:
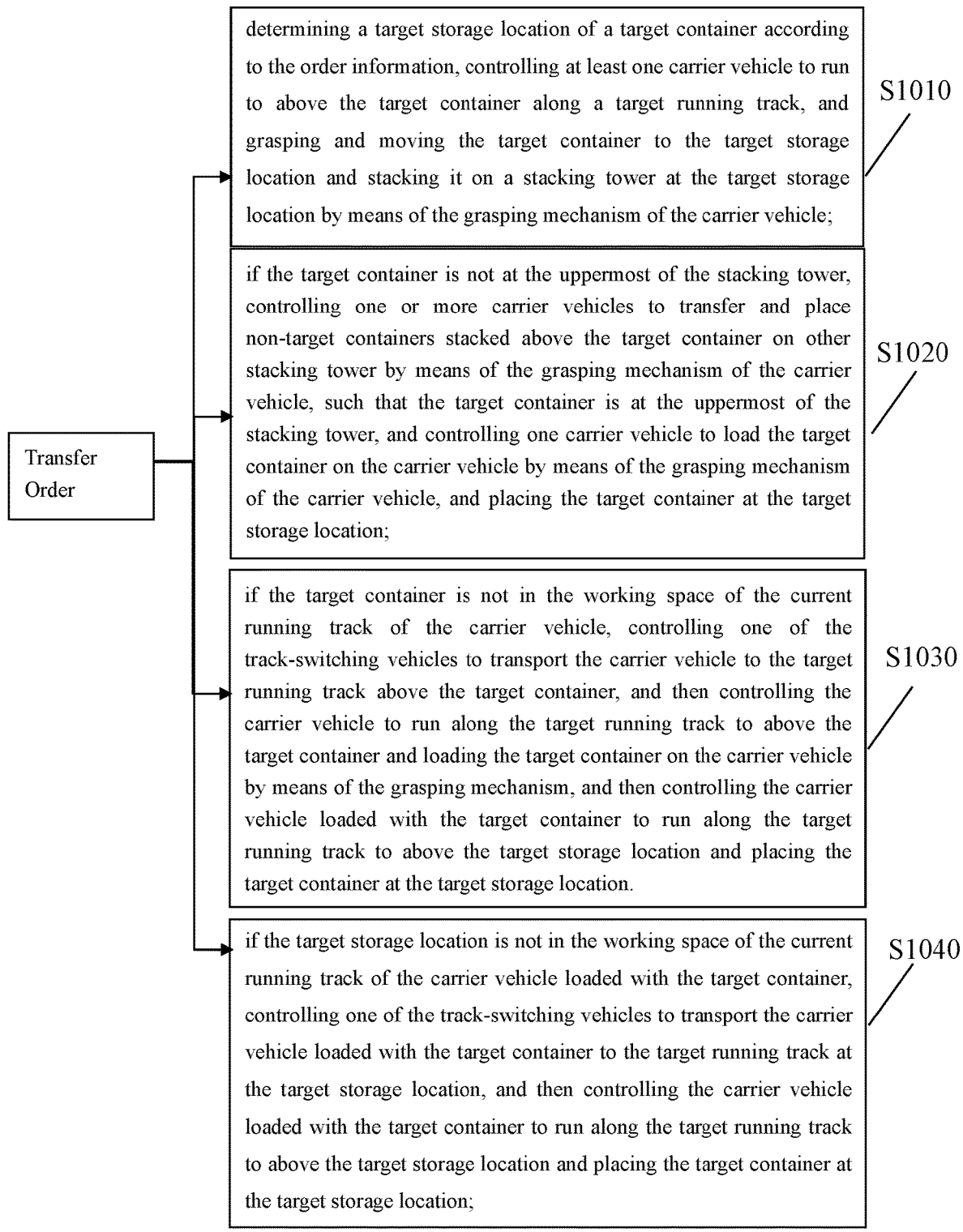

As shown in FIG. 10, when processing the transfer order, the method includes as follows.

S1010: determining a target storage location of a target container according to the order information, controlling at least one carrier vehicle to run to above the target container along a target running track, and grasping and moving the target container to the target storage location and stacking it on a stacking tower at the target storage location by means of the grasping mechanism of the carrier vehicle.

S1020: if the target container is not at the topmost of the stacking tower, controlling one or more carrier vehicles to transfer and place non-target containers stacked above the target container on other stacking tower by means of the grasping mechanism of the carrier vehicle, such that the target container is at the topmost of the stacking tower, and controlling one carrier vehicle to load the target container on the carrier vehicle by means of the grasping mechanism of the carrier vehicle, and placing the target container at the target storage location.

In S1020, during transferring and placing non-target containers stacked above the target container on other stacking tower, the containers can be transferred one by one or in batch.

S1030: if the target container is not in the working space of the current running track of the carrier vehicle, controlling one of the track-switching vehicles to transport the carrier vehicle to the target running track above the target container, and then controlling the carrier vehicle to run along the target running track to above the target container and load the target container on the carrier vehicle by means of the grasping mechanism, and then controlling the carrier vehicle loaded with the target container to run along the target running track to above the target storage location and place the target container at the target storage location.

S1040: if the target storage location is not in the working space of the current running track of the carrier vehicle loaded with the target container, controlling one of the track-switching vehicles to transport the carrier vehicle loaded with the target container to the target running track at the target storage location, and then controlling the carrier vehicle loaded with the target container to run along the target running track to above the target storage location and place the target container at the target storage location.

The working space of the carrier vehicle refers to the area covered by the current running track of the carrier vehicle, that is, the area in which the container can be grasped when the carrier vehicle runs on the current running track. Similarly, in the method of FIG. 10, the target container is generally placed on the topmost layer of the target storage location or the topmost of the stacking tower, but in some embodiments, the target container can also be placed in another specific layer of the target storage location or an appropriate position in the stacking tower.

It should be noted that the steps of the methods described and claimed here do not need to be performed in the described order, and one method does not necessarily perform all the steps described.

The plurality of track-switching vehicles run on the transition track, and the transition track is connected perpendicularly to an end of a corresponding running track. The carrier vehicle can move while suspended between the running rails. The track-switching vehicle can move while suspended between the transition rails, and during the track changing process, the carrier vehicle is suspended under the track-switching vehicle. The top of the running track serves as the at least one load-bearing platform.

The specific structures and operations of the rack, containers, carrier vehicles, and track-switching device in the container storage system and the method for storing and retrieving the target container from the container storage system can be understood by referring to the detailed description of each module in the foregoing embodiments, which will not be repeated herein.

The above descriptions are only preferred embodiments of the present invention and are not intended to limit the present invention, and any modification, equivalent replacement, improvement, etc. made within the spirit and principle of the present invention shall be included in the protection scope of the present invention.

The invention claimed is:

1. A container storage system, comprising:
a rack comprising a track structure and defining at least one load-bearing platform, the track structure comprising a plurality of running tracks, and the at least one load-bearing platform being located below the running tracks;
a plurality of containers, each container configured to store goods, and at least part of the containers being stacked and placed on the at least one load-bearing platform;
a carrier vehicle configured to move back and forth on the running tracks to perform storage and retrieval operations to containers in the container storage system; and
a track-switching device configured to switch the carrier vehicle from a current running track where the carrier vehicle is located to a target running track;
wherein each running track is formed by load-bearing tubes each having a tube cavity, the carrier vehicle comprises a moving mechanism and a grasping mechanism, the moving mechanism comprises rollers disposed and capable of rolling in the tube cavity of the load-bearing tube, and the grasping mechanism is located below the running track and comprises a gripper for grasping the container;
wherein the grasping mechanism comprises a gripper rotation device and a lifting device; the lifting device comprises a lifting platform, a lifting belt and a lifting driving device for the lifting belt; and the gripper rotation device comprises a gripper, a gripper driving device and a gripper platform;
wherein the gripper driving device is disposed on the gripper platform, the gripper is disposed on the side of the gripper platform, a part of the gripper that grasps the goods is a free end which extends out of the gripper platform to under the platform, and a fixed end of the gripper is fixed on the gripper rotation shaft, the gripper rotation shaft is connected with the gripper driving device, and the driving device drives the gripper rotation shaft to rotate thereby driving the gripper to rotate;
wherein the lifting driving device is arranged on the lifting platform, the lifting platform is located above the gripper platform, the lifting driving device is connected to the gripper platform through the lifting belt, a lower end of the lifting belt is fixed on the gripper platform, an upper end of the lifting belt is disposed on the lifting driving device, the lifting driving device drags the lifting belt to move up and down, and the lifting belt drives the gripper platform to move up and down;
wherein the gripper rotation device comprises a gripper rotation motor, a transmission shaft, a gripper rotation shaft and the gripper: the gripper rotation motor is in transmission connection with the transmission shaft, and both ends of the transmission shaft are provided with gripper rotation shafts; the transmission shaft is in transmission connection with the gripper rotation shaft, the gripper is mounted on the gripper rotation shaft, the gripper rotation motor drives the transmission shaft to rotate, the transmission shaft drives the gripper rotation shafts at both ends to rotate, the gripper rotation shaft drives the gripper to rotate, and the gripper rotates to realize the action of grasping and releasing the goods container; and
wherein the lifting belt is a belt, and a lower end of the belt is fixed on the gripper platform; the lifting driving device is in transmission connection with a winder on which an upper end of the belt is fixed.

2. The container storage system according to claim 1, wherein the track-switching device comprises:
a transition track connected with an end of each running track; and
a track-switching vehicle located on the transition track and movable back and forth on the transition track, the track-switching vehicle configured to receive the carrier vehicle and transport the carrier vehicle along the transition track to the target running track.

3. The container storage system according to claim 2, wherein the rack comprises a plurality of track layers, each track layer is provided with one of the at least one load-bearing platform under it, and each track layer is provided with a plurality of parallel running tracks, the container storage system is provided with the carrier vehicle and the track-switching device corresponding to each track layer.

4. The container storage system according to claim 3, wherein the container storage system includes at least one processor, and the at least one processor is configured for:
controlling the plurality of carrier vehicles and/or track-switching vehicles to run on the rack,
controlling at least one of the plurality of carrier vehicles to store a container containing ordered goods in the container storage system,
controlling at least one of the plurality of carrier vehicles to retrieve at least one container containing ordered goods from the container storage system to deliver the at least one retrieved container to a workstation,
controlling at least one of the plurality of carrier vehicles to store at least one container containing at least one picked goods in the container storage system, the at least one picked goods coming from the at least one retrieved container, and
controlling at least one of the plurality of track-switching vehicles to transport a corresponding carrier vehicle to the target running track.

5. The container storage system according to claim 2, wherein the track-switching vehicle comprises a vehicle body and a moving mechanism mounted on the vehicle body, the moving mechanism is connected with a driving device, and the driving device drives the moving mechanism to drive the track-switching vehicle to move back and forth on the transition track; wherein the moving mechanism of the track-switching vehicle comprises a roller device, the roller device comprises vertical rollers and horizontal rollers disposed in the transition track, wherein the vertical rollers roll in the bottom of the transition track, and the horizontal rollers roll on inner side walls of the transition track.

6. The container storage system according to claim 1, wherein the rack comprises columns and a plurality of pairs of the load-bearing tubes fixed indirectly or directly on the columns, and two of the load-bearing tubes are arranged in parallel to form one of the running tracks, each load-bearing tube is tubular and comprises the tube cavity for the rollers to roll in it, the load-bearing tube is provided with a notch along an axial direction of the tube for the rollers to insert, the notches of the two load-bearing tubes are arranged facing to each other, and the carrier vehicle is suspended between the two load-bearing tubes and moves between the two load-bearing tubes along the axial direction.

7. The container storage system according to claim 6, wherein a side of the load-bearing tube where the notch is defined is an inner side of the load-bearing tube, the inner side comprises a first side portion located above the notch and a second side portion located below the notch, and carrier vehicle positioning holes are provided in any one of the first side portion and the second side portion.

8. A container storage system, comprising:
a rack comprising a track structure and defining at least one load-bearing platform, the track structure comprising a plurality of running tracks, and the at least one load-bearing platform being located below the running tracks;
a plurality of containers, each container configured to store goods, and at least part of the containers being stacked and placed on the at least one load-bearing platform;
a carrier vehicle configured to move back and forth on the running tracks to perform storage and retrieval operations to containers in the container storage system; and
a track-switching device configured to switch the carrier vehicle from a current running track where the carrier vehicle is located to a target running track;
wherein the track-switching device comprises:
a transition track connected with an end of each running track; and
a track-switching vehicle located on the transition track and movable back and forth on the transition track, the track-switching vehicle configured to receive the carrier vehicle and transport the carrier vehicle along the transition track to the target running track;
wherein the track-switching vehicle comprises a vehicle body and a moving mechanism mounted on the vehicle body, the moving mechanism is connected with a driving device, and the driving device drives the moving mechanism to drive the track-switching vehicle to move back and forth on the transition track;
wherein the track-switching vehicle is provided with docking rails on its vehicle body, and the docking rails are configured to be docked with the running track to receive the carrier vehicle.

9. The container storage system according to claim 8, wherein a docking rail base is fixed on the vehicle body, the docking rails are movably connected with the docking rail base, the docking rails are connected with a docking rail driver, and the docking rail driver is configured to drive the docking rails so that the docking rails can move back and forth on the docking rail base.

10. The container storage system according to claim 9, wherein a sliding block is provided on an outer side of each docking rail, the docking rail base comprises a sliding groove, and the sliding block is located in the sliding groove of the docking rail base.

11. The container storage system according to claim 8, wherein a fixing device for the carrier vehicle is provided on the vehicle body, and the fixing device is configured to push the track-switching vehicle and the carrier vehicle together during track changing.

12. The container storage system according to claim 11, wherein the fixing device for the carrier vehicle is arranged on a side of the track-switching vehicle, the fixing device for the carrier vehicle comprises a fixing device motor, a compactor and a retractor, wherein the retractor connects the fixing device motor and the compactor, the compactor is configured to urge the side of the carrier vehicle, and the fixing device motor adjusts the forward and backward action of the compactor through the retractor.

13. A container storage system, comprising:
a rack comprising a track structure and defining at least one load-bearing platform, the track structure comprising a plurality of running tracks, and the at least one load-bearing platform being located below the running tracks;
a plurality of containers, each container configured to store goods, and at least part of the containers being stacked and placed on the at least one load-bearing platform;
a carrier vehicle configured to move back and forth on the running tracks to perform storage and retrieval operations to containers in the container storage system, and
a track-switching device configured to switch the carrier vehicle from a current running track where the carrier vehicle is located to a target running track;
wherein the track-switching device comprises:
a transition track connected with an end of each running track; and
a track-switching vehicle located on the transition track and movable back and forth on the transition track, the track-switching vehicle configured to receive the carrier vehicle and transport the carrier vehicle along the transition track to the target running track;
wherein the track-switching vehicle comprises a vehicle body and a moving mechanism mounted on the vehicle body, the moving mechanism is connected with a driving device, and the driving device drives the moving mechanism to drive the track-switching vehicle to move back and forth on the transition track; wherein the moving mechanism of the track-switching vehicle comprises a two-axle roller assembly and a roller driving device, the roller driving device comprises a motor and a transmission pair, the transmission pair connects the roller driving device and roller axles, both ends of each roller axle are provided with rollers, the roller driving device drives the roller axles to rotate through the transmission pair, and the roller axles drives the rollers to rotate.

14. The container storage system according to claim 13, wherein the transmission pair is a belt transmission device, the belt transmission device is drivingly connected to the two axles, the motor drives belts on the belt transmission device, the belts drive the two axles to rotate, and the axles in turn drive the rollers to rotate.

* * * * *